US012040933B2

(12) United States Patent
Thomas et al.

(10) Patent No.: US 12,040,933 B2
(45) Date of Patent: Jul. 16, 2024

(54) NETWORK EVENT DATA STREAMING PLATFORM FOR BATCH DISTRIBUTION AND STREAMING OF NETWORK EVENT DATA

(71) Applicant: Chime Financial, Inc., San Francisco, CA (US)

(72) Inventors: Sherin Thomas, San Francisco, CA (US); Jayanth Bharadwaj, New York, NY (US); Arun Mehta, San Francisco, CA (US); Karthik Raj, Oakland, CA (US); Bhashinee Garg, Oakland, CA (US)

(73) Assignee: Chime Financial, Inc., San Francisco, CA (US)

( * ) Notice: Subject to any disclaimer, the term of this patent is extended or adjusted under 35 U.S.C. 154(b) by 0 days.

(21) Appl. No.: 18/063,904

(22) Filed: Dec. 9, 2022

(65) Prior Publication Data

US 2024/0195675 A1   Jun. 13, 2024

(51) Int. Cl.
*H04L 41/0604* (2022.01)
*H04L 41/069* (2022.01)

(52) U.S. Cl.
CPC ........ *H04L 41/0604* (2013.01); *H04L 41/069* (2013.01)

(58) Field of Classification Search
CPC .......................... H04L 41/0604; H04L 41/069
USPC ....................................................... 709/224
See application file for complete search history.

(56) References Cited

U.S. PATENT DOCUMENTS

| | | | |
|---|---|---|---|
| 11,218,498 B2* | 1/2022 | Hajimirsadeghi | G06N 3/02 |
| 11,522,812 B1* | 12/2022 | Thoppai | G06F 16/901 |
| 11,580,842 B1* | 2/2023 | Hauser | G08B 21/182 |
| 11,595,124 B2* | 2/2023 | Ye | H04L 41/5019 |
| 11,601,196 B2* | 3/2023 | Ye | H04B 10/071 |
| 11,620,157 B2* | 4/2023 | Sriharsha | G06F 16/285 714/25 |
| 11,625,181 B1* | 4/2023 | Bernat | G06F 3/0644 711/154 |
| 11,627,034 B1* | 4/2023 | Chawathe | H04L 41/0631 709/224 |

(Continued)

OTHER PUBLICATIONS

Lebanon, G et al. "Thoughts on System Design for Big Data," Computing with Data, Chapter 14, Springer, 2018, pp. 495-541. (Year: 2018).*

(Continued)

*Primary Examiner* — Melvin H Pollack
(74) *Attorney, Agent, or Firm* — Keller Preece PLLC

(57) ABSTRACT

This disclosure describes an event bus system that, as part of an inter-network facilitation system, can generate and distribute network events for self-service event requests utilizing a network event data streaming platform. For example, the disclosed systems can utilize a network event data streaming platform that includes specialized network components, such as a batch distribution data lake and an event fanning platform. The disclosed systems can utilize the batch distribution data lake to distribute long-retention network events for high-latency event requests. Additionally, the disclosed systems can utilize the event fanning platform to generate low-latency fanned data streams from short-retention network events for low-latency event requests.

20 Claims, 8 Drawing Sheets

(56) References Cited

U.S. PATENT DOCUMENTS

| | | | |
|---|---|---|---|
| 11,630,598 B1* | 4/2023 | Sillifant | G06F 3/065 |
| | | | 711/165 |
| 11,630,706 B2* | 4/2023 | Doshi | G06F 9/5005 |
| | | | 718/104 |
| 11,636,116 B2* | 4/2023 | Kulkarni | G06F 16/2428 |
| | | | 707/741 |
| 11,636,128 B1* | 4/2023 | Bigdelu | G06F 16/2428 |
| | | | 707/722 |
| 11,638,051 B2* | 4/2023 | Yeganeh | H04N 21/2225 |
| | | | 709/231 |
| 11,663,176 B2* | 5/2023 | Sriharsha | G06F 16/258 |
| | | | 707/804 |
| 11,663,219 B1* | 5/2023 | Profirovic | G06F 16/2457 |
| | | | 707/713 |
| 11,671,312 B2* | 6/2023 | Puri | H04L 43/04 |
| | | | 709/224 |
| 11,675,473 B1* | 6/2023 | Breeden | G06F 3/04847 |
| | | | 715/738 |
| 11,681,445 B2* | 6/2023 | Vohra | G06N 3/08 |
| | | | 711/163 |
| 11,698,914 B1* | 7/2023 | Duvedi | G06F 16/28 |
| | | | 707/803 |
| 11,720,548 B1* | 8/2023 | Opincariu | G06F 16/24552 |
| | | | 707/600 |
| 11,735,186 B2* | 8/2023 | Zimmerman | G06F 40/166 |
| | | | 704/235 |
| 11,736,616 B1* | 8/2023 | Rigby | H04M 3/5158 |
| | | | 379/265.13 |
| 11,775,584 B1* | 10/2023 | Sharma | G06F 16/90335 |
| | | | 707/769 |
| 11,782,771 B2* | 10/2023 | Jha | G06F 9/5077 |
| | | | 719/318 |
| 11,789,950 B1* | 10/2023 | Bernier | G06F 16/24568 |
| | | | 707/769 |
| 11,799,794 B2* | 10/2023 | Trim | H04W 28/0278 |
| 2021/0320820 A1* | 10/2021 | Ruan | H04L 49/602 |
| 2021/0328886 A1* | 10/2021 | Guim Bernat | H04L 41/0896 |
| 2022/0116455 A1* | 4/2022 | Raghunath | H04L 41/5025 |
| 2022/0294816 A1* | 9/2022 | Martin | G06F 16/9038 |
| 2022/0398252 A1* | 12/2022 | Pal | G06F 16/248 |
| 2022/0405619 A1* | 12/2022 | Ramamurthy | G06F 16/9024 |
| 2023/0006889 A1* | 1/2023 | Thyagaturu | H04L 41/5054 |
| 2023/0108310 A1* | 4/2023 | Jiang | H04N 21/24 |
| | | | 725/116 |
| 2023/0116881 A1* | 4/2023 | Mehta | H04L 43/065 |
| | | | 709/238 |
| 2023/0117221 A1* | 4/2023 | Cohen | G06F 9/5072 |
| | | | 718/104 |
| 2023/0120592 A1* | 4/2023 | Deshwal | G06F 16/24568 |
| | | | 707/760 |
| 2023/0125903 A1* | 4/2023 | Kozin | H04W 4/029 |
| | | | 455/456.1 |
| 2023/0195444 A1* | 6/2023 | Vohra | G06F 9/455 |
| | | | 717/172 |
| 2023/0237065 A1* | 7/2023 | Kulkarni | G06F 3/0619 |
| | | | 707/634 |
| 2023/0342177 A1* | 10/2023 | Shetty | G06F 9/45545 |
| 2023/0342290 A1* | 10/2023 | Tumanova | G06F 13/1668 |

OTHER PUBLICATIONS

Thusoo, Ashish et al. "Data Warehousing and Analytics Infrastructure at Facebook," SIGMOF, ACM, Jun. 6-10, 2010, pp. 1013-1020. (Year: 2010).*

Hunt, Randall. "Amazon Kinesis Data Streams Adds Enhanced Fan-Out and HTTP/2 for Faster Streaming," Amazon Kinesis, Analytics, AWS Big Data, AWS News Blog, Aug. 21, 2018. (Year: 2018).*

Pierleoni, Paola et al. "Amazon, Google and Microsoft Solutions for IoT: Architectures and a Performance Comparison," IEEE Access, vol. 8, Jan. 9, 2020, pp. 5455-5470. (Year: 2020).*

Vinoth. "Apache Hudi—The Data Lake Platform," Apache Blog, Jul. 21, 2021. (Year: 2021).*

Sarda, Meena. "Batch Processing vs Stream Processing," Cloud Training Program, K21 Academy, Jul. 22, 2022. (Year: 2022).*

Dennis, Amber Lee. "Data Lakes 101: An Overview," Dataversity, Aug. 25, 2016. (Year: 2016).*

Munshi, Amr A. and Mohammed, Yasser Abdel-Rady. "Data Lake Lambda Architecture for Smart Grids Big Data Analytics," IEEE Access, vol. 6, Jul. 23, 2018, 40463-40471. (Year: 2018).*

Trinh, Huy et al. "Energy-Aware Mobile Edge Computing and Routing for Low Latency Visual Data Processing," IEEE Transactions on Multimedia, vol. 20, No. 10, Oct. 2018, 2562-2577. (Year: 2018).*

* cited by examiner

NETWORK EVENT DATA STREAMING PLATFORM FOR BATCH DISTRIBUTION AND STREAMING OF NETWORK EVENT DATA

BACKGROUND

Recent years have seen significant developments in systems that utilize distributed computing resources to process large data volumes in generating and managing digital accounts across computer networks. For example, conventional systems utilize a variety of computing devices to manage and track network data, including changes or updates. To illustrate, conventional systems utilize various computer algorithms to manage, track, and store network data by using data packages called "events" that include certain parameters defining the data. Although conventional systems utilize various computer-implemented algorithms to generate and manage network events, conventional systems nevertheless suffer from a number of technical deficiencies, particularly with regard to computational efficiency, flexibility, and network reliability.

As just suggested, some existing networking systems are inefficient. In particular, some prior networking systems waste computer processing resources and network bandwidth resources by providing constant broadcasts of data streams across several platforms to provide access to network event data. Indeed, to provide access to network data events (e.g., to internal network components or to third-party systems) many existing systems indiscriminately distribute network events within data streams, which requires constant broadcasting of the network event data regardless of if (or how many) other systems are requesting the data. As networks grow larger and as more network events are distributed across these prior systems, the processing and bandwidth requirements for maintaining the data streams across a growing number of network events likewise increase in size (not only hampering efficiency but also preventing scalability). By streaming such large amounts of information, these conventional systems require substantial computer processing resources and network bandwidth capacity that might otherwise be reduced with a more efficient system.

As a contributing factor to their inefficiencies, some prior network systems are inflexible. To elaborate, many existing systems utilize a one-size-fits-all approach to distributing network event data. For example, regardless of whether a requesting system requires event data frequently and quickly or sporadically where timing is less of a concern, existing systems often distribute the event data uniformly in a data stream in all circumstances. Over large numbers of network events, this process of generating and broadcasting so many data streams becomes computationally expensive and bandwidth consumptive. Thus, many conventional systems waste computer processing resources and network bandwidth by rigidly maintaining data streams, even in cases where the network event data from the streams is unused or even unrequested.

Due at least in part to their inflexible nature, many conventional networking systems are also unreliable. More specifically, some existing systems compromise network stability and reliability by uniformly streaming network event data regardless of demand for the data. Thus, not only do these existing systems waste resources when demand is low, but these systems are also prone to crashes, slowdowns, or other network stability issues when demand is high. For instance, without ways to balance distribution of network event data across streams, some data streams may have such high demand that the servers broadcasting the data streams become bogged down with requests and may be unable to process the requests, resulting in poor network performance or a network crash.

These, along with additional problems and issues, exist with conventional networking systems.

SUMMARY

This disclosure describes one or more embodiments of methods, non-transitory computer-readable media, and systems that can solve the foregoing problems in addition to providing other benefits. Particularly, the disclosed systems can improve computational efficiency, flexibility, and network reliability by utilizing a network event data streaming platform to generate and distribute network event data using a self-service approach. For example, the disclosed systems can utilize a network event data streaming platform that is scalable and flexible to distribute network events from a data lake and/or from a fanned data stream associated with an event fanning platform. In some cases, rather than requiring specific curation of event data (e.g., by a developer team or a developer system) for each individual event request, the disclosed systems enable self-service event requests to access and discover event data available within the data lake and/or a fanned data stream. To facilitate self-service event requests, the disclosed systems implement sub-components or internal platforms that make up the network event data streaming platform for managing, storing, and distributing network data for network events.

BRIEF DESCRIPTION OF THE DRAWINGS

The detailed description refers to the drawings briefly described below.

DETAILED DESCRIPTION

Figure 1:
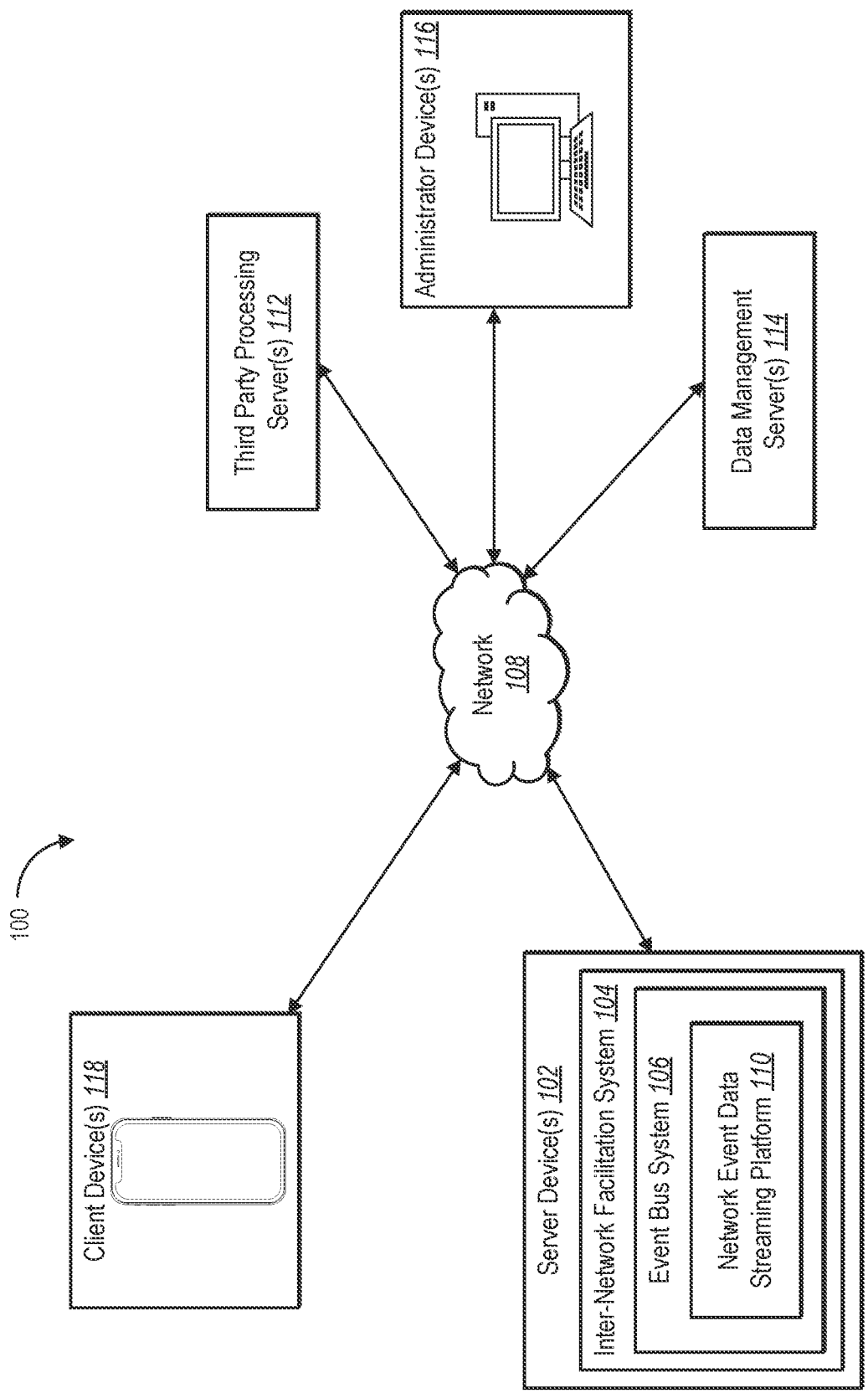
FIG. 1 illustrates a block diagram of an environment for implementing an inter-network facilitation system and an event bus system in accordance with one or more embodiments.

This disclosure describes an event bus system that can efficiently, flexibly, and reliably distribute network event data across networks and systems using a network event data streaming platform. In some situations, network-based systems pass information (e.g., network events) among multiple servers hosting multiple compartmentalized components, modules, or services (with shared or independent processor(s)) to perform respective functions, where different network components generate and receive different data to perform their respective functions as part of the overarching ecosystem. For instance, in response to a request from a network component (or a third-party system) to access transaction data for a particular geographic area, for a certain time period, and/or for a particular (type of) digital account within an inter-network facilitation system, the event bus system can provide a network event including the requested transaction data to the requesting network component (or third-party system) from one or more servers that make up a network event data streaming platform.

As just mentioned, the event bus system can utilize a network event data streaming platform for distributing network event data to requesting components or third-party systems. For example, the event bus system receives an event request from a network component or a third-party system and provides network event data based on the event request. Along these lines, rather than requiring developer curation of network event data to locate and collect data for a received event request, the event bus system can instead make network event data available in a self-service fashion. More specifically, the event bus system can utilize a network event data streaming platform that readily provides network events to requesting network components/systems from respective event platform sources where they are housed for distribution. Thus, in response to receiving a self-service event request, the event bus system can identify the event platform source for the requested event and can provide the requested event from the identified source. In some cases, the event bus system can further make network events discoverable throughout the network event data streaming platform (e.g., at their respective sources) such that requesting network components/systems can view or otherwise identify network events available for request.

To facilitate distribution of network event data in a self-service fashion, the event bus system generates and houses one or more event source platforms (e.g., on servers for distributing network event data) within an overall network event data streaming platform. Particularly, the event bus system distinguishes between short-retention network events and long-retention network events by generating and maintaining separate event source platforms for short-retention and long-retention network events. For instance, the event bus system streams short-term network events using a specialized event fanning platform and stores long-retention network events within a batch distribution data lake. Indeed, the event bus system can facilitate streaming of certain network events and batch distribution of other network events, depending on requirements associated with event requests.

To elaborate, the event bus system can determine (or receive an indication of) a latency of a requested network event indicated by a received (self-service) event request. Based on the latency, the event bus system can determine whether the requested network event is a short-retention network event or a long-retention network event (which further dictates where the event is stored and available for distribution within the network event data streaming platform). Indeed, the event bus system can select an event platform source for distributing the requested network event. If the latency is below a threshold latency, the event bus system determines that the requested event is a short-retention event (e.g., an event with low latency) and selects an event fanning platform as the source from which to distribute the requested event. On the other hand, if the latency is above a threshold latency, the event bus system determines that the requested event is a long-retention event (e.g., an event with high latency) and selects a batch distribution data lake as the source from which to distribute the requested event. Additional detail regarding the distinctions between, and the distribution of, short-retention and long-retention network events is provided below with reference to the figures.

As suggested above, the disclosed event bus system provides several improvements or advantages over conventional networking systems. For example, the event bus system can improve computational efficiency over prior systems. As opposed to prior systems that require excessive computational and bandwidth resources to broadcast data streams for each network event, the event bus system can reduce the computational and bandwidth requirements using a network event data streaming platform. Specifically, by intelligently utilizing a batch distribution data lake and an event fanning platform (as part of the network event data streaming platform), the event bus system can more efficiently distribute network event data. Indeed, rather than streaming data for each network event, the event bus system determines latencies for requested network events and uses either an event fanning platform to stream a network event or a batch distribution data lake to provide the network event. As a result of streaming only a portion of the network events and distributing others using the data lake, the event bus system preserves computer processing and network bandwidth resources wasted by prior systems that use less efficient techniques.

Contributing to the improved efficiencies, the event bus system can provide improved flexibility over prior networking systems. For example, some prior systems are rigidly fixed to a one-size-fits-all approach to distributing network event data by indiscriminately generating data streams for each event. The event bus system, by contrast, distinguishes between long-retention and short-retention network events, flexibly adapting different network resources to each type of network event. Consequently, the event bus system can perform batch distribution for some network events using a batch distribution data lake which requires less processing power and network bandwidth compared to the constant streaming of existing systems. Such processing and bandwidth improvements are especially pronounced in larger systems, where the numbers of network events, digital accounts, and network components is greater (and therefore requires more transmissions of network events).

In addition to improving efficiency and flexibility, the event bus system can also improve data reliability and network stability over existing networking systems. While some existing network systems are prone to crashes or other network stability issues due to imbalanced resource management across data streams, the event bus system can utilize a network event data streaming platform that balances resource management and prevents overloads on data streams. For example, the event bus system can implement an event fanning platform that configures network events and fans them out according to event requests, creating a single event stream instance for each use case. By ensuring one-to-one stream instances to request use cases, the event bus system prevents overloads or other imbalances of network resources, thereby reducing slowdowns and crashes and more reliably providing requested event data.

Additionally, the event bus system can improve the efficiency of user interfaces for accessing, subscribing to, and generating network events. Indeed, some existing systems require interactions from both requester devices and developer devices to navigate through network data to locate and subscribe to network events for curating data specific to a new event request. Processing the device interactions from requester devices and developer devices in these prior systems wastes computing resources, such as processing power and memory. By contrast, the event bus system preserves computing resources by facilitating self-service event requests where no developer devices are necessary to assist in locating or subscribing to event data. Rather, the event bus system provides an efficient self-service request interface that simplifies the process of subscribing to network events by consolidating and presenting network events in a single location. Thus, the event bus system enables a requesting device to select and subscribe to network events via an efficient, unified pipeline (e.g., the network event data streaming platform).

The event bus system can further improve scalability over conventional networking systems. As opposed to existing systems that require many different systems or platforms to manage different types of events and corresponding event requests, the event bus system can utilize a network event data streaming platform that consolidates the management of all network events into a single platform or bus. Thus, as the network of an inter-network facilitation system grows larger, previous systems required independent updates and compatibility checks across a patchwork of systems to keep them working together to facilitate distribution of network events, whereas the event bus system is easily scalable as a consistent set of compatible network components.

As indicated by the foregoing discussion, the present disclosure utilizes a variety of terms to describe features and advantages of the event bus system. For example, as used herein, the term "inter-network facilitation system" refers to a system that, via the event bus system, facilitates digital communications across different computing systems over one or more networks. For example, an inter-network facilitation system manages digital accounts, such as credit accounts, bank accounts, transaction card accounts, and secured accounts in addition to financial information, such as funds transfers, withdrawals, deposits, and loans for one or more user profiles registered within the inter-network facilitation system. In some cases, the inter-network facilitation system is a centralized network system that includes multiple network components for facilitating access to online digital accounts via a central network location. Indeed, the inter-network facilitation system can link accounts from different network-based financial institutions to provide information regarding, and management tools for, the different accounts.

Additionally, the term "network component" (or sometimes simply "component") refers to a computer application or subsystem operated by one or more processors (hosted by one or more servers) that are dedicated to a particular computer task or process. For example, a network component can be part of a larger network-based system and can be communicatively coupled (e.g., via a computer network) to other network components for passing data therebetween to form a networking environment of cooperating network components. A network component can perform one or more tasks associated with one or more applications (e.g., client device applications) that access an inter-network facilitation system. Thus, an inter-network facilitation system can include multiple (containerized) network components that each perform respective functions as subsystems within the system. In certain embodiments, a network component refers to a server running a specific process. In some cases, one network component receives event requests received from another network component, while yet another network component generates a digital payload for the received request. Example network components can include a global data stream manager that manages network events, an event fanning platform that configures and fans out individual stream instances for low latency network events, an event logging engine that generates and registers network events, and a batch distribution data lake that stores high latency network events for long-term retention. One or more of the network components described herein can be part of an overall platform or bus, such as a "network event data streaming platform" for facilitating distribution of network events.

As mentioned, in some embodiments, the event bus system can manage and distribute network events. As used herein, a "network event" (or simply "event") refers to a discretized portion of network data (e.g., a digital payload) that represents or codifies an occurrence with a computer system or a computer network. For example, a network event can include an immutable segment of computer code that represents a network transaction, such as a transfer of assets from one digital account to another, a deposit into a digital account, a withdrawal from a digital account, a credit check on a digital account, a purchase made by a digital account, or some other recordable occurrence within an inter-network facilitation system. A network event can include computer code representing client device interactions, such as clicks, views, or scrolls or can include computer code representing other computer system events such as network traffic information, login events, crash events, or slowdown events. A network event can include code defining various attributes or parameters associated with a network transaction, including a source network component, a target network component, a timestamp, processing requirements, a latency requirement, an amount associated with a transaction, a geographic area of the transaction, and/or other information.

Relatedly, a "long-retention network event" refers to a network event that is stored for longer than a threshold duration of time. For instance, a long-retention network event includes a network event with a latency that exceeds a threshold latency. In some cases, the latency of a network event indicates or reflects a time period in which a network event is to be provided in response to an event request (e.g., including processing time and/or transmission time). Thus, a long-retention network event can refer to a network event with a high latency that does not need fast (e.g., immediate or real time) turnaround but that can instead be transmitted via batch distribution from long-term data storage (e.g., from a batch distribution data lake). Conversely, a "short-retention network event" refers to a network event that is stored for less than a threshold duration of time. For example, a short-retention network event includes a network event with a latency that is below a threshold latency and that therefore requires fast (e.g., immediate or real-time) turnaround in response to an event request. Thus, a short-retention network event can refer to a network event that is broadcast in one or more low-latency fanned data streams configured and maintained by an event fanning platform.

In some embodiments, the event bus system can receive self-service event requests. As used herein, the term "self-service event request" refers to a network event request from a network component or a third-party system that requests one or more network events from an inter-network facilitation system. For example, a self-service event request includes an event request that is self-selected from among available transaction requests hosted by (or able to be hosted by) a network event data streaming platform and/or self-initiated for generation and registration within the network event data streaming platform. Indeed, unlike prior systems that require developers (or developer systems) to curate network events to fulfill requests or that require requesting components/systems to notify developer systems or interact with provider network components, the event bus system facilitates self-selection by allowing requesting network components or requesting third-party systems to browse or select network events from the network event data streaming platform and/or to request a new network event creatable by the constituent network components of the network event data streaming platform without such prescriptive notification or interaction.

As mentioned above, in some embodiments, the event bus system utilizes a batch distribution data lake to distribute high-latency network events. As used herein, a "batch distribution data lake" (or simply "data lake") refers to a network repository or database of network events associated with an inter-network facilitation system. Indeed, the event bus system creates and manages a batch distribution data lake as part of a network event data streaming platform by reading network events from a global data stream and writing the network events to a network event database (e.g., the data lake) for long-term retention (e.g., above a threshold latency). In some cases, the event bus system stores every network event of the network event data streaming platform (from the global event stream) within the batch distribution data lake. Additional detail regarding the data lake is provided below with reference to the figures.

As also mentioned above, in some embodiments, the event bus system utilizes an event fanning platform to distribute low-latency network events. As used herein, an "event fanning platform" refers to a network component of a network event data streaming platform that configures network events (according to fanning configurations) and fans out events into low-latency fanned data streams. For example, an event fanning platform extracts short-retention network events from a global data stream and generates low-latency fanned data streams. In some instances, the event fanning platform generates fanned data streams such that a single use case (e.g., a single event request or single consumer component/system) for a network event has its own fanned data stream to ensure stability, speed, and reliability of the network data transmission. In some embodiments, an event fanning platform further performs access control checks to verify permissions of requesting network components or third-party systems to access requested network event data (and/or to remove unpermitted event data from a fanned data stream to prevent its access). Additional detail regarding the event fanning platform is provided below with reference to the figures.

Additional detail regarding the event bus system will now be provided with reference to the figures. In particular, FIG. 1 illustrates a block diagram of a system environment (or "environment") 100 for implementing an inter-network facilitation system 104 and an event bus system 106 in accordance with one or more embodiments. As shown in FIG. 1, the environment 100 includes server device(s) 102, third party processing server(s) 112, data management server(s) 114, administrator device(s) 116, and client device(s) 118 connected via a network 108. While FIG. 1 shows an embodiment of the event bus system 106, alternative embodiments and configurations are possible. Furthermore, although FIG. 1 illustrates the event bus system 106 being implemented by a particular component and/or device within the environment 100, the event bus system 106 can be implemented, in whole or in part, by other computing devices and/or components in the environment 100 (e.g., the administrator device(s) 116 and/or the client device(s) 118). Additional description regarding the illustrated computing devices is provided with respect to FIGS. 7-8 below.

As shown in FIG. 1, the server device(s) 102 can include the inter-network facilitation system 104. In some embodiments, the inter-network facilitation system 104 determines, stores, generates, and/or displays financial information corresponding to a digital account (e.g., a banking application, a money transfer application). Furthermore, the inter-network facilitation system 104 can electronically communicate (or facilitate) financial transactions between one or more digital accounts (and/or computing devices). In some embodiments, the inter-network facilitation system 104 also tracks and/or monitors financial transactions and/or financial transaction behaviors of a user within a user profile.

Indeed, in some examples, the inter-network facilitation system 104 facilitates financial transactions and digital communications across different computing systems and/or network components over one or more transaction computer networks. Indeed, in some cases, the environment 100 also includes transaction computer network devices (or "transaction computer networks"). The transaction computer network devices can include a variety of computer devices for implementing, facilitating, processing, or executing a transaction. Thus, for instance, the transaction computer network devices can include a card transaction computer network for implementing a variety of transactions using cards (e.g., credit cards, debit cards, etc.). Similarly, the transaction computer network devices can include an ACH transaction computer network (e.g., computing devices for implementing ACH transactions), and the transaction computer network devices can include a transfer transaction computer network (e.g., computing devices for implementing transfer transactions between accounts).

For example, the inter-network facilitation system 104 manages digital accounts, such as credit accounts, secured accounts, and other accounts for a single account registered within the inter-network facilitation system 104. In some cases, the inter-network facilitation system 104 is a centralized network system that facilitates access to online banking accounts, credit accounts, and other accounts within a central network location. Indeed, the inter-network facilitation system 104 can link accounts from different network-based financial institutions (e.g., transaction computer network devices) to provide information regarding, and management tools for, the different accounts. Furthermore, the event bus system 106 can provide various user interfaces and information for display (e.g., via the administrator device(s) 116 and/or the client device(s) 118).

As also illustrated in FIG. 1, the environment 100 includes the administrator device(s) 116 and the client device(s) 118. For example, the administrator device(s) 116 and the client device(s) 118 may include, but are not limited to, a mobile device (e.g., smartphone, tablet) or other type of computing device, including those explained below with reference to FIGS. 7-8. For example, the administrator device(s) 116 can include computing devices that display user interfaces for administrating or managing settings, configurations, pipelines, or data for the inter-network facilitation system 104. Moreover, the client device(s) 118 can include computing devices associated with (and/or operated by) users and corresponding user profiles for the inter-network facilitation system 104. In some embodiments, the client device(s) 118 include computing devices that display user interfaces for managing digital accounts and/or network events (e.g., transferring assets, making payments, etc.) and/or portraying information regarding digital accounts (e.g., account transactions, account balances, etc.). Moreover, although FIG. 1 illustrates a single instance of the administrator device(s) 116 and the client device(s) 118, the environment 100 can include various numbers of administrator or client devices that communicate and/or interact with the inter-network facilitation system 104 and/or the event bus system 106.

In one or more embodiments, the client device(s) 118 include a client application. The client application can include instructions that (upon execution) cause the client device(s) 118 to perform various actions. For example, a user associated with an account can interact with the client application on the client device(s) 118 to access financial information, initiate a financial transaction, or modify account settings. In some embodiments, the administrator device(s) 116 also includes an administrator application similar to the client application. The client application may be a web application or a native application (e.g., a mobile application, a desktop application, etc.). In one or more implementations, the client application interfaces with the inter-network facilitation system 104 to provide digital content including graphical user interfaces to the client device(s) 118. In one or more implementations, the client application comprises a browser that renders graphical user interfaces on the display of the client device(s) 118.

In certain instances, the client device(s) 118 corresponds to one or more user accounts (e.g., user accounts stored at the server device(s) 102). For instance, a user of a client device can establish a user profile with login credentials and various information corresponding to the user. In addition, the digital accounts and/or user profiles can include information regarding financial information and/or financial transaction information for users (e.g., name, telephone number, address, bank account number, credit amount, debt amount, financial asset amount), payment information, transaction history information, and/or contacts for financial transactions. In some embodiments, a digital account and/or a user profile can be accessed via multiple devices (e.g., multiple client devices) when authorized and authenticated.

The present disclosure utilizes client devices to refer to devices associated with such user profiles. In referring to a client device, the disclosure and the claims are not limited to communications with a specific device, but any device corresponding to a user profile of a particular user. Accordingly, in using the term computing device, this disclosure can refer to any computing device corresponding to a user profile of an inter-network facilitation system.

As shown, the environment 100 also includes third party processing server(s) 112. For example, in one or more embodiments, the inter-network facilitation system 104 utilizes the third party processing server(s) 112 to assist in processing transactions (e.g., managing a system of record, transferring funds between accounts, implementing transaction pipelines, etc.). In some cases, the third party processing server(s) 112 house and operate third party systems, such as machine learning servers, event databases, and/or other network components that consume or utilize network event data. The third party processing server(s) 112 can include a variety of server devices, as described below in relation to FIGS. 7-8.

Furthermore, as illustrated in FIG. 1, the environment 100 also includes data management server(s) 114. The data management server(s) 114 can include integrated or external (e.g., third party) servers for storing, analyzing, and managing data volumes. For example, the data management server(s) 114 can include a variety of cloud/web-based systems for storing, processing, analyzing, and delivering transaction data, event data, and/or account data. The data management server(s) 114 can include a variety of server devices, as described in relation to FIGS. 7-8.

As further shown in FIG. 1, the environment 100 includes the network 108. As mentioned above, the network 108 can enable communication between components of the environment 100. In one or more embodiments, the network 108 may include a suitable network and may communicate using a various number of communication platforms and technologies suitable for transmitting data and/or communication signals, examples of which are described with reference to FIGS. 7-8. Furthermore, although FIG. 1 illustrates the server device(s) 102, the third party processing server(s) 112, the data management server(s) 114, and the administrator device(s) 116 communicating via the network 108, the various components of the environment 100 can communicate and/or interact via other methods (e.g., the server device(s) 102 and the administrator device(s) 116 can communicate directly).

As illustrated in FIG. 1, the event bus system 106 includes a network event data streaming platform 110. In particular, the network event data streaming platform 110 includes a number of network components (housed on the server device(s) 102 or elsewhere in the environment 100) that work together to generate and distribution network events. For example, the network event data streaming platform 110 includes event logging engines (housed on event logging servers) that generate and register network events. In addition, the network event data streaming platform 110 includes a global data stream that includes all network events for the inter-network facilitation system 104 and that passes (or makes available) the network events to other network components, such as an event persister that reads high-latency network events from the global event data stream and writes the events to a batch distribution data lake and an event fanning platform that configures low-latency network event streams (according to event fanning configurations) and fans the low-latency events to consumer application data streams (e.g., for consumption by consumer applications) and/or the third party processing server(s) 112.

Figure 2:
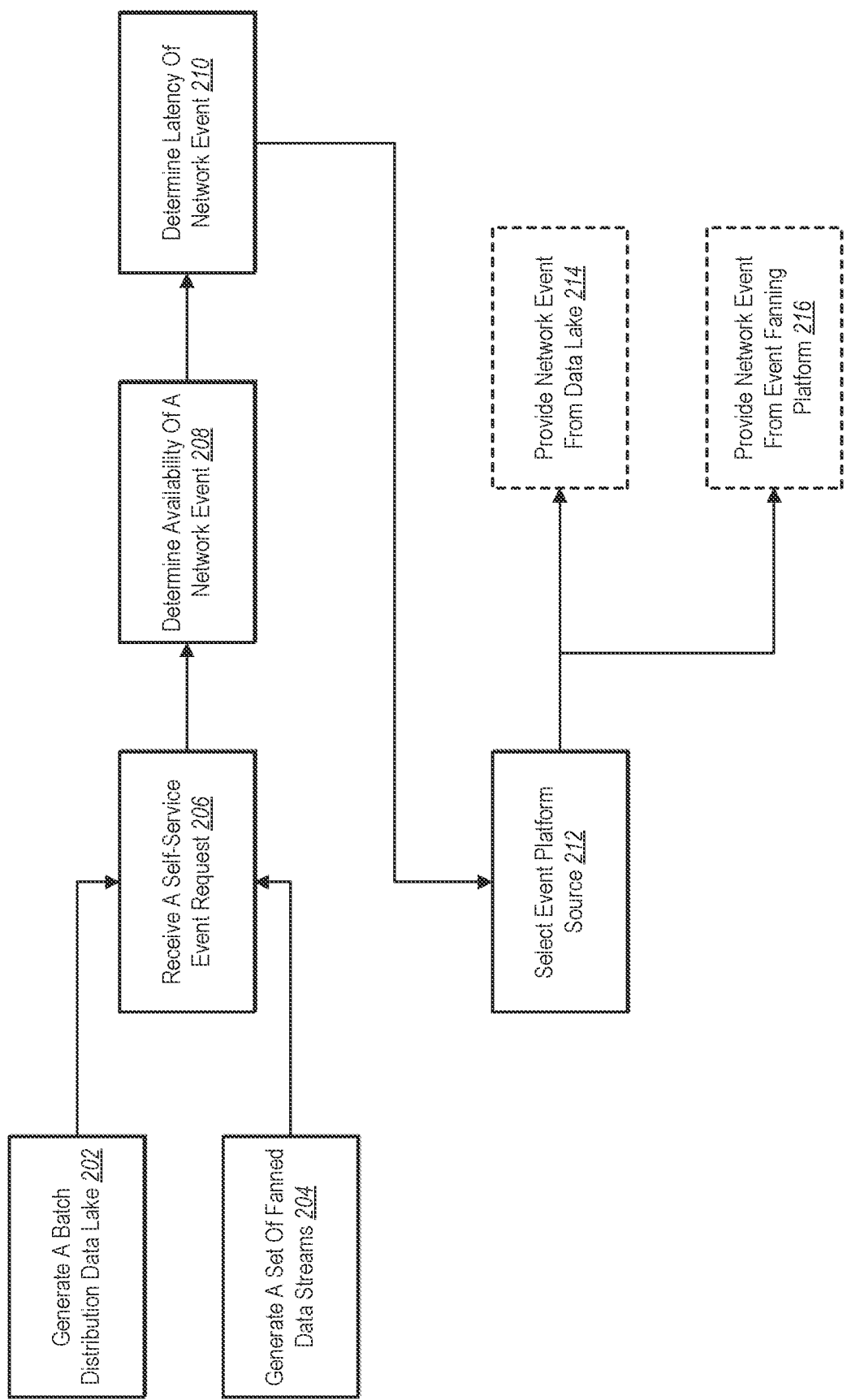
FIG. 2 illustrates an example overview of generating and distributing network events using a network event data streaming platform in accordance with one or more embodiments.

As mentioned, in certain embodiments, the event bus system 106 can generate and provide network events utilizing a network event data streaming platform. In particular, the event bus system 106 can utilize various sub-components of a network event data streaming platform to distribute network events according to various parameters or requirements of event requests. FIG. 2 illustrates an example overview of generating and distributing network events using a network event data streaming platform in accordance with one or more embodiments. Additional detail regarding the various acts of FIG. 2 is provided thereafter with reference to subsequent figures.

As illustrated in FIG. 2, the event bus system 106 performs an act 202 to generate a batch distribution data lake. In particular, the event bus system 106 generates a batch distribution data lake that stores network events for long-term retention. In some cases, the event bus system 106 stores every network event from the inter-network facilitation system 104 in the batch distribution data lake. In other cases, the event bus system 106 may store only a subset of the network events in the batch distribution data lake, such as high-latency network events that are for long-term retention (e.g., for event requests that do not require fast delivery of network events). To store network events in the data lake, the event bus system 106 reads (using an event persister) network events from a global event stream and writes the network events to a network event database. Additional detail regarding the batch distribution data lake is provided with reference to subsequent figures.

As further illustrated in FIG. 2, the event bus system 106 performs an act 204 to generate a set of fanned data streams. In particular, the event bus system 106 generates fanned data streams for short-retention, low-latency network events. To elaborate, the event bus system 106 utilizes an event fanning platform to configure and broadcast low-latency fanned data streams for event requests that require faster delivery of network events (e.g., from network events within the global event data stream). Indeed, the event fanning platform consumes network events from the global event data stream (e.g., by extracting short-retention network events) and generates low-latency fanned data streams to make available for consumer applications (e.g., event transformation engines) and/or third party processing servers. Additional detail regarding the event fanning platform and the low-latency fanned data streams is provided with reference to subsequent figures.

In addition, the event bus system 106 performs an act 206 to receive a self-service event request. More specifically, the event bus system 106 receives an event request indicating a requested network event from the global data stream. For instance, the self-service event request indicates a network event for a consumer application or a third party processing server to process for generating a prediction, a report, or some other output. Indeed, in some cases, the event bus system 106 receives the self-service event request from a third party processing server, a consumer application, a client device, or some other network component of the inter-network facilitation system 104. To facilitate the self-service event request, in one or more embodiments, the event bus system 106 enables the requesting component/system to access and browse available network events (or to request a new network event).

As shown, the event bus system 106 further performs an act 208 to determine availability of a network event. For example, the event bus system 106 determines whether the requested network event (indicated by the self-service event request) is available within the global event data stream of the network event data streaming platform. In some embodiments, the event bus system 106 analyzes the batch distribution data lake and/or the fanned data streams of the event fanning platform to determine whether the requested event is available or stored.

Upon determining the availability of the network event, the event bus system 106 performs an act 210 to determine a latency of the network event. For instance, the event bus system 106 determines a latency associated with the requested network event indicated by the self-service transaction request. In some cases, the event bus system 106 receives an indication of a latency requirement from an administrator device 116 arranging or creating a network event. To determine a latency of a requested network event, in one or more embodiments, the event bus system 106 determines a processing time requirement and/or a delivery time requirement for the requested network event. For example, the event bus system 106 receives or determines a latency requirement as part of a received event request. In some cases, for instance, a requesting component/system requires low-latency delivery of a network event for more immediate use to generate a report or a machine learning prediction. In other cases, the requesting component/system requires less urgent delivery where a high latency is acceptable.

In certain embodiments, the event bus system 106 determines that the network event is unavailable (e.g., does not exist within the global event data stream or elsewhere in the network event data streaming platform). As described in further detail below, based on determining that a requested network event is unavailable, the event bus system 106 generates and registers a new transaction request using one or more event logging components/servers of the network event data streaming platform. The event bus system 106 further stores the new network event in the batch distribution data lake and provides the new network event to the requesting component/system.

As further illustrated in FIG. 2, the event bus system 106 performs an act 212 to select an event source platform. More particularly, the event bus system 106 selects an event source platform as a network component (or server) from the network event data streaming platform for providing or distributing the requested network event. In some embodiments, the event bus system 106 selects an event source platform based on the latency of the requested network event. In some cases, the event bus system 106 compares the latency of the requested network event with a threshold latency. For instance, based on determining that the latency of the requested network event is above the threshold latency, the event bus system 106 selects the batch distribution data lake as the event source platform for providing the requested network event. Based on determining that the latency of the requested network event is below the threshold latency, on the other hand, the event bus system 106 selects the event fanning platform (or a fanned data stream from the event fanning platform) as the event source platform for the requested network event.

In one or more embodiments, based on selecting the batch distribution data lake as the event source platform, the event bus system 106 performs an act 214 to provide the requested network event from the data lake. In particular, the event bus system 106 provides the requested network event to a consumer application, a consumer network component, or a third party system from a long-term storage database based on determining that the requested network event has a high latency requirement that exceeds a latency threshold (or does not have a low latency requirement that is below a threshold latency).

In certain embodiments, based on selecting the event fanning platform as the event source platform, the event bus system 106 performs an act 216 to provide the requested network event from the event fanning platform. In particular, the event bus system 106 provides the requested network event to a consumer application, a consumer network component, or a third party system from a fanned data stream on determining that the requested network event has a low latency requirement that is below a latency threshold.

Figure 3:
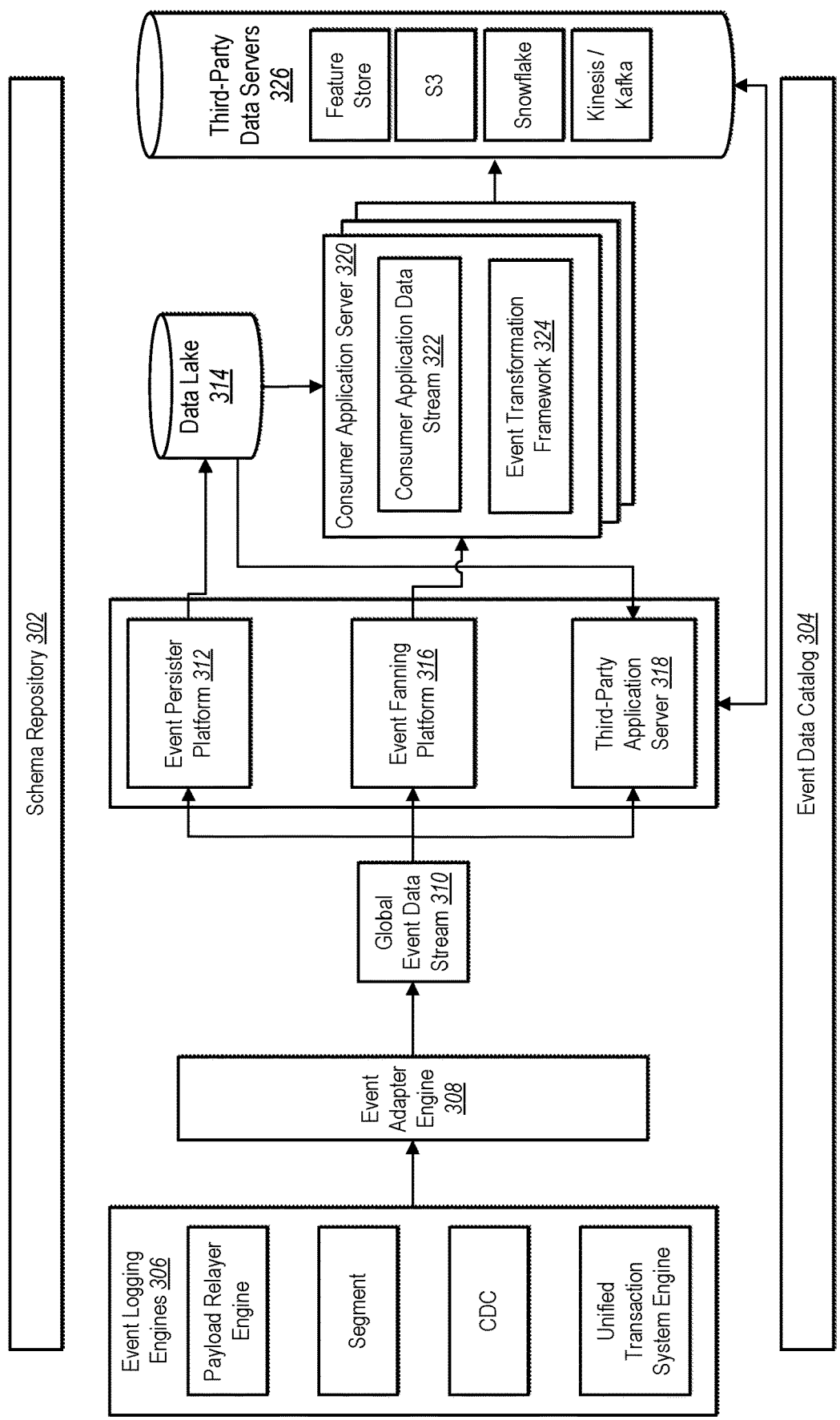
FIG. 3 illustrates an example diagram of a network event data streaming platform in accordance with one or more embodiments.

As mentioned above, in certain described embodiments, the event bus system 106 utilizes a network event data streaming platform for facilitating generation, storage, and distribution of network events. In particular, the event bus system 106 utilizes a network event data streaming platform that is housed on one or more servers and that includes various network components, such as even logging engines, a global event data stream, a batch distribution data lake, and an event fanning platform. FIG. 3 illustrates an example architecture diagram of a network event data streaming platform (e.g., the network event data streaming platform 110) including its various network components for facilitating self-in accordance with one or more embodiments.

As illustrated in FIG. 3, the network event data streaming platform includes a schema repository 302. In particular, the schema repository 302 includes or stores schemas for translating or converting network events or payload schemas into compatible data formats or data shapes (e.g., so that one network component/server can process or utilize the event data transmitted by another network component/server). Thus, the event bus system 106 can utilize schemas to generate schematized versions of network events for (universal) compatibility across multiple network components and/or servers associated with a network event data streaming platform and/or the inter-network facilitation system 104. For instance, the event bus system 106 can utilize schemas as described in U.S. patent application Ser. No. 17/930,623, entitled "Generating and Updating Payload Schemas for Maintaining Compatibility in Evolving Digital Systems," which is hereby incorporated by reference in its entirety.

As further illustrated in FIG. 3, the network event data streaming platform includes one or more event logging engines 306 (e.g., housed on event logging servers), such as a payload relayer engine, a Segment engine, a change data capture ("CDC") engine, and a unified transaction system engine. The event logging engines 306 can generate and register network events with the network event data streaming platform and/or the inter-network facilitation system 104. For example, the payload relayer engine and/or the Segment engine generate (and make available or accessible) network events using streaming protocols, Simple Notification Service ("SNS") protocols, and/or Simple Queueing Service ("SQS") protocols to pass the network events from publisher network components to subscriber network components. In some cases, the event bus system 106 ensures a one to one mapping between a network event and a payload topic to which the event is published. In one or more embodiments, the payload relayer engine refers to the staggered payload relayer described in U.S. patent application Ser. No. 17/932,943 entitled STAGGERED PAYLOAD RELAYER FOR PIPELINING DIGITAL PAYLOADS ACROSS NETWORK SERVICES, filed Sep. 16, 2022, which is hereby incorporated by reference in its entirety.

Additionally, the CDC engine utilizes a set of software design patterns to determine and track data that has changed for performing further processing based on the changed data. For instance, the CDC engine utilizes one or more CDC mechanisms, such as timestamps, version indicators, status indicators, triggers on tables, and/or log scanners to monitor changes to network event data and initiate execution of additional computer functions based on the changes (e.g., by other network components of the network event data streaming platform). Further, the unified transaction system engine utilizes a number of transaction computer networks to manage and facilitate generation and distribution of network event data pertaining to card transactions, ACH transactions, and/or transfer transactions. In some embodiments, the unified transaction system engine refers to the unified transaction system described in U.S. patent application Ser. No. 17/805,385 entitled GENERATING AND PUBLISHING UNIFIED TRANSACTION STREAMS FROM A PLURALITY OF COMPUTER NETWORKS FOR DOWNSTREAM COMPUTER SERVICE SYSTEMS, filed Jun. 3, 2022, which is hereby incorporated by reference in its entirety.

In one or more embodiments, the event bus system 106 implements, standardizes, or applies a set of requirements across the event logger engines 306 so that network events generated within the network event data streaming platform and added to the global event data stream 310 are ingested in the same manner, irrespective of the event logging engine used. For instance, the event bus system 106 enforces that the event logging engines 306 write schematized versions of network events into the global event data stream 310. Thus, the global event data stream 310 broadcasts the schematized versions of the network events for consumption by downstream component/systems. In addition, the event logging engines 306 generate network events using asynchronous writes without impacting the main code path (of the network event data streaming platform).

Further, the event logging engines 306 generate parameters or features for network events, including event context pertaining to services and devices associated with the network event. In some embodiments, the event logging engines 306 generate additional parameters, such as indicators for dropped events, write latency, and event generation retries. In these or other embodiments, the event logging engines 306 generate a polyglot (e.g., multilanguage or inter-language compatible) solution to facilitate event production from different computer languages, including Python, RoR, Go, and others.

In certain embodiments, the event logging engines 306 produce network events to the global event data stream 310 with a random partitioning key to evenly distribution writes across shards. To elaborate, the event logging engines 306 utilize partitioning keys to distribute network events across shards (or horizontal database partitions) associated with the global event data stream 310. In some cases, the event logging engines 306 also integrate schemas from the schema repository 302 as a central source of truth for event schemas. Further, the event logging engines 306 can utilize durable writes to write network events to the global event data stream 310 by providing mechanisms for replaying failed evens and/or to accommodate dead letter queue support.

As further illustrated in FIG. 3, the network event data streaming platform includes an event adapter engine 308. In certain embodiments, the network event data streaming platform includes multiple instances of the event adapter engine 308, one for each of the different event logging engines 306. In particular, the event adapter engine 308 writes network events to the global event data stream 310 from the event logging engines 306. In some cases, the event adapter engine 308 converts the format or shape of data for a network event generated by the event logging engines 306 into a more generic format that is acceptable or compatible with streaming platforms (e.g., for use downstream of the global event data stream 310). For instance, the event adapter engine 308 generates and adds a wrapper on each network event, where the wrapper contains metadata associated with a streaming platform, such as a timestamp, an identifier of the source of the event (e.g., one of the event logging engines 306), and/or other metadata. Thus, the event adapter engine 308 writes adapted network events to the global event data stream 310 including the event wrappers. In some cases, the event adapter engine 308 accesses the schema repository 302 to write schematized versions of network events to the global event data stream 310.

As just mentioned, the network event data streaming platform includes a global event data stream 310. Indeed, the global event data stream 310 includes, streams, or broadcasts (all) schematized network events produced within the inter-network facilitation system 104. By using the global event data stream 310, the event bus system 106 facilitates one-touch event production. To elaborate, when a new event is added to the network event data streaming platform, the event bus system 106 writes the event to the global event data stream 310 (and persisted to the data lake 314) without requiring new event logging publishers or additional network infrastructure.

In addition, the global event data stream 310 facilitates maintaining a common infrastructure across different network events. Indeed, by writing all network events for the inter-network facilitation system 104 to the global event data stream 310, the event bus system 106 can maintain and scale common infrastructure more easily than systems where network events are stored or streamed without a common source of truth. Further, using the global event data stream 310 enables the event bus system 106 to decouple production and consumption of network events. Particularly, by using the global event data stream 310, the event bus system 106 avoids the event logging engines 306 that produce network events needing to have access to data associated with network components (e.g., consumer applications or third party systems) as the global event data stream 310 maintains network events. In addition, by using the global event data stream 310, the event bus system 106 builds an event history for replays, backfills, and subsequent uses of network events.

In one or more embodiments, the global event data stream 310 uses random partitioning/sharding. Indeed, by using the global event data stream 310, the event bus system 106 prevents data skew and allows scaling up and down based on read and write throughput. In addition, the event bus system 106 keeps event data distributed evenly across server shards irrespective of event type (e.g., without guaranteeing any particular order). Within the global event data stream 310, the event bus system 106 maintains each network event using a standard envelope schema (from the schema repository 302) containing metadata, such as event time, device identification (e.g., for providers and requesters), location information, and serialized schematized payload information as well as payload schema information. For instance, the event bus system 106 generates and writes a network event to the global event data stream 310 having the following format:
{
  event_time_in_ms: Long,
  ingested_time_in_ms: Long,
  device_id: String,
  lat: Long,
  lng: Long,
  event_payload: bytes,
  event_payload_schema: String, # for deserializing/processing the event_payload
}.

Within the global event data stream 310, the event bus system 106 can determine retention durations (e.g., long-term or short-term) using downtime service level objectives ("SLOs") of consumer network components that will read from the global event data stream 310 (e.g., the event persister platform 312 and the event fanning platform 316). In some cases, the event bus system 106 utilizes a single global event data stream 310.

In other cases, the event bus system 106 utilizes multiple instances of the global event data stream 310 as well as multiple copies of a dedicated event persister platform 312 and an event fanning platform 316. For instance, if the event bus system 106 determines that there is a large discrepancy (e.g., larger than a threshold discrepancy) in throughput between different types of network events (e.g., for purchases, credit transactions, transfers, or ACH transactions), then the event bus system 106 uses different instances of the global event data stream 310 (and/or other network components) for the different network event types. Indeed, client device/click events are generally higher volume than server events. Additionally, in some embodiments the event bus system 106 uses different instances of the global event data stream 310 (and/or other network components) in circumstances where there is greater than a threshold discrepancy in event production/ingestion time. For example, client device events sometimes have an ingestion delay longer than other event types, and using multiple instances of network components may overcome the timing challenge that can arise in these circumstances, especially where the event bus system 106 does not impose event ordering in the global event data stream 310.

In certain cases, the event bus system 106 uses different instances of network components (or the transaction even data streaming platform altogether) for different geographic regions. In these or other cases, the event bus system 106 supports event logging across different geographic regions (e.g., among different instances of the transaction even data streaming platform). Further, the event bus system 106 can auto-scale network components and server resources (e.g., without administrator instruction or input) to adjust throughput of network events based on event logging and event requests.

As further illustrated in FIG. 3, the transaction even data streaming platform includes an event persister platform 312 and a data lake 314 (e.g., a batch distribution data lake). The event persister platform 312 reads network events from the global event data stream 310 and writes the network events to the data lake 314. In some cases, the event persister platform 312 writes all network events for the entire inter-network facilitation system 104 (or for an instance of the transaction even data streaming platform) to the data lake 314 for long-term retention. In certain embodiments, the event persister platform 312 writes raw network events to the data lake 314 without any changes or transformations from the global event data stream 310. The event bus system 106 maintains the data lake 314 to provide network events to requesting components/systems in cases where the request does not require low latency (e.g., lower than a threshold latency) and batch distribution is acceptable.

In one or more embodiments, the event persister platform 312 stores network events in the data lake 314 in a format compatible with programmatic reads via Spark, Flint, Snowflake, or other stream or batch processing technology. In these or other embodiments, the event persister platform 312 and/or the data lake 314 partitions the stored network events according to event name, schema version, day, and hour parameters associated with the various network events. The event bus system 106 can use or distribute raw events in the data lake 314 for high-latency event requests involving backfills, replays, and/or bootstrapping. Because low latency is generally not a requirement for these tasks, the event bus system 106 can implement less stringent data freshness SLOs for network events in the data lake 314.

In one or more embodiments, the event persister platform 312 includes a streaming component that reads event data from the global event data stream 310 to persist the event data to a network event database for long-term retention. In these or other embodiments, the event persister platform 312 also includes a batch component for data compaction and duplication reduction. Indeed, by using a batch component for storing network events in the data lake 314, the event persister platform 312 (and/or the data lake 314) can facilitate batch distribution of network events, where one or more network events are provided or distributed from the data lake 314 to a requesting component/system automatically (e.g., without additional input or guidance from the requesting component/system or an administrator device or a developer device).

In certain cases, the event bus system 106 registers partitions (e.g., between network events) of the data lake 314 within an event data catalog 304. Indeed, as shown, the network event data streaming platform includes an event data catalog 304. Registering partitions within the event data catalog 304 allows the event bus system 106 to make partition swaps and to move event data around without impacting downstream consumer network components/systems. The event bus system 106 utilizes the event data catalog 304 for partition discovery to avoid reliance on hardcoded locations of network events within the data lake 314. Additional detail regarding the event data catalog 304 is provided below.

In some embodiments, the event bus system 106 obscures network event data within the data lake 314 for improved security. For example, the event bus system 106 makes actual storage locations of events within the data lake 314 difficult to discover and imposes fine-grained access control at the catalog level.

In one or more embodiments, the event bus system 106 encrypts event data stored within the data lake 314. To elaborate, the event bus system 106 performs server-side encryption during reads and writes of event data from the global event data stream 310 (e.g., S3) based on an encryption key received with a network event request. In some cases, the event bus system 106 uses a single global encryption key for all data of a network event (or for all network events).

In certain embodiments, the event bus system 106 utilizes the data lake 314 for long-term (e.g., exceeding a threshold duration or infinite) retention. For example, the data lake 314 can default to long-term retention with an opt-out for specific use cases. The event bus system 106 can also use the data lake 314 for an event history that enables model back-testing. For instance, the event bus system 106 can reduce retention for network events in the data lake 314 on a per-event basis and can enable partition discovery via user attributes so that partitions can be updated to remove certain user information (e.g., personally identifiable information or "PIP").

To reduce computational cost, in some cases, the event bus system 106 distributes the data lake 314 across different server storage locations and/or types of databases. For example, the event bus system 106 monitors frequency and/or volume of event requests for different (types of) network events and stores less frequently accessed data in cheaper (e.g., less resource-intensive) storage such as S3 Glacier Instant Access. The event bus system 106 can further monitor and determine access patterns for different (types of) network event to update retention policies and move network events between storage locations of the data lake 314 to improve efficiency and recall.

As further illustrated in FIG. 3, the network event data streaming platform includes an event fanning platform 316. Indeed, as mentioned above, the event bus system 106 utilizes the event fanning platform 316 to generate low-latency fanned data streams to broadcast network events to requesting network components or third-party systems. For example, the event bus system 106 receives a network event request and determines a latency requirement for the request.

Based on determining that the latency requirement is below a latency threshold, the event bus system 106 further determines that using the data lake 314 is not a viable option to provide the requested network event at the required speed (or in the required time) indicated by the latency of the request. Accordingly, the event bus system 106 utilizes the event fanning platform 316 to generate a fanned data stream for the requested event for access by the requesting component/system.

In some embodiments, the event fanning platform 316 fans out network events to consumer application data streams (e.g., low-latency fanned data streams), such as the consumer application data stream 322 on the consumer application server 320. For instance, the event fanning platform 316 includes a processor that reads from a single data stream (e.g., the global event data stream 310) and writes to multiple streams based on a set of declarative configurations dictating what events need to be written to which consumer application data stream (or consumer application server).

To elaborate, based on receiving a network event request, the event bus system 106 determines or identifies an event fanning configuration (as defined by the request or a previous/initial request) that indicates a configuration for one or more requested network events. Specifically, an event fanning configuration indicates a destination data stream (and its streaming protocol or stream type, such as Kineses or Kafka) along with network events to provide to the destination data stream. In one or more embodiments, the event fanning platform 316 can update an event fanning configuration dynamically based on a new or updated event request, based on permissions associated with a requesting component/system, and/or according to throughput metrics and server capacity. In some cases, an event fanning configuration has the following format:

```
[
    {
        stream:     "arn:aws:kinesis:us-east-1:802476504392:
            stream/de-segmentatom-alerts-login-prod",
        events: [
        {
            name: "chime.risk.v1.UserEnrollmenEvent",
            query: "SELECT*FROM chime.risk.v1.UserEn-
                rollmenEvent
                WHERE location IS 'SF' OR location IS 'NYC'"
        }
        ]
    }
].
```

Based on an event fanning configuration indicating one or more short-retention network events, the event fanning platform 316 generates a corresponding low-latency fanned data stream for the requested short-retention network events. The event fanning platform 316 further provides or broadcasts the low-latency fanned data stream to a requesting component, such as the consumer application server 320 or a third-party data server from among the third-party data servers 326. For instance, the event fanning platform 316 provides or broadcasts the fanned data stream to the consumer application data stream 322 on the consumer application server 320. Indeed, the consumer application server 320 generates and provides the event request including an event fanning configuration, whereupon the event fanning platform 316 fans out the relevant events to the appropriate consumer application data stream 322.

In one or more embodiments, the event fanning platform 316 performs an access control check to verify permissions for network event data. To elaborate, based on an event request, the event fanning platform 316 analyzes permissions associated with a requesting component/system (e.g., the consumer application server 320 or the third-party data servers 326) to verify that the requesting component/system is permitted to access the event data requested as part of a self-service network event request. In some cases, the event bus system 106 removes a portion of the event data from low-latency fanned data stream based on the access control check to only provide or stream network event data that is permitted within each fanned data stream.

In certain embodiments, the event fanning platform 316 prevents or reduces slowdowns or crashes by generating or distributing a single low-latency fanned data stream to each requesting consumer application server 320 (e.g., to consumer application data stream 322) or requesting third-party data server. Indeed, the event fanning platform 316 filters network event data to provide in a fanned data stream based on a received self-serve event request (e.g., to remove data other than requested event data). As an example, a requesting consumer application server is generating a report on click events per user in the San Francisco area. By filtering out event data where the location is not San Francisco during the write process to the respective fanned data stream, the fanning platform 316 manages throughput more easily and simplifies data provided to the consumer application server.

In some cases, the event fanning platform 316 not only tailors each fanned data stream for each request based on an event fanning configuration and filtering of event data according to request indications and permissions but further provides reliable data streaming by dedicating server resources to broadcast each stream to its recipient on a one-to-one basis. For instance, the event fanning platform 316 can limit distribution of each fanned data stream to a single consumer application server or third-party data server. By managing low-latency fanned data streams on a one-to-one basis with consumer applications (or consumer application servers), the event fanning platform 316 facilitates a fully self-serve system where event data management is passed to consumer application servers (which define requests and event fanning configurations) rather than remaining with central servers of the event bus system 106 or the network event data streaming platform.

As further illustrated in FIG. 3, the network event data streaming platform includes downstream consumer components and systems, such as a consumer application server 320 and third-party data servers 326. For instance, the event bus system 106 receives a network event request from the consumer application server 320 and/or the third-party data servers 326, where the network event request indicates a requested network event. To provide the requested network event (from the data lake 314 or the event fanning platform 316) to the consumer application server 320, the event bus system 106 generates or spins up a consumer application data stream 322. In some cases, the event bus system 106 further provisions infrastructure such as server capacity and network bandwidth for running the consumer application associated with the consumer application data stream 322.

The consumer application server 320 thus executes a consumer application using data within the consumer application data stream 322. Consumer applications include applications for tracking device interactions, reporting on network stability/data loss, identifying login attempts, generating financial reports, executing asset transfers, checking account credit, or performing some other transaction. The event bus system 106 maintains the life cycle of the consumer application data stream 322 based on the life cycle of the corresponding consumer application. In response to detecting that the consumer application is deprecated, the event bus system 106 further removes or deprecates the consumer application data stream 322 as well.

As further illustrated in FIG. 3, the network event data streaming platform includes an event transformation framework 324. In particular, the event transformation framework 324 sits downstream of the data lake 314 and the consumer application data stream 322 (e.g., the low-latency fanned data stream from the event fanning platform 316). In some embodiments, the event transformation framework 324 analyzes or processing network event data to perform a transformation, aggregation, projection, join, or some other function using event data. For instance, the event transformation framework 324 can include or communicate with various data processing technologies or event transformation engines, such as a batch processor, Snowpipe, Amazon Web Service ("AWS") Lambda, Glue (e.g., Structured Spark), Airflow, and/or Amazon Kinesis Data Analytics ("KDA").

In certain cases, the event bus system 106 does not require users to specify which technology is needed to process batch or streaming data for a self-service event request. Rather, the event bus system 106 receives the self-service event request and automatically selects the appropriate event transformation engine according to transformation logic and event fanning configuration parameters indicated by the event request. For instance, the event transformation framework 324 may select Glue for batch distribution and streaming. By abstracting the choice of transformation away from requesters, the event bus system 106 enables the underlying infrastructure of the network event data streaming platform to evolve independently (and avoids the need for users to educate themselves on different transformation engines).

As suggested, in some embodiments, the event bus system 106 provides a requested network event to a third-party data server from among the third-party data servers 326. To provide the requested network event to the third-party data servers 326, the event bus system 106 utilizes a third-party application server 318 as a connector to the third-party data servers 326. In some cases, the third-party application server 318 reads from the data lake 314 and/or the event fanning platform 316 to provide a requested network event to the third-party data servers 326. In other cases, the third-party application server 318 reads directly from the global event data stream 310 to provide a requested network event. By providing network events to the third-party data servers 326, the event bus system 106 facilitates functions such as report generation, machine learning predictions, asset transfers, and/or other functions associated with the inter-network facilitation system 104.

As mentioned above, the network event data streaming platform includes the event data catalog 304. In particular, the event data catalog 304 catalogs data partitions in the data lake 314 as well as for the low-latency fanned data streams (e.g., the consumer application data stream 322) of the event fanning platform 316. For example, the event data catalog 304 can include two constituent data catalogs—one for the data lake 314 for data discovery and execution of applications that read offline data and one for the event fanning platform 316 used for governance and lineage of the network event data in the streams.

To elaborate on the data lake portion of the event data catalog 304, the event bus system 106 provides a lightweight catalog on top of the data lake 314 to enable partition discovery by requesting components/systems. To facilitate self-service transaction requests, the catalog is query-able with filter criteria, such as "event name" and "date range."

The event bus system 106 writes to the data lake portion of the event data catalog 304 in certain circumstances, such as: i) when a new event is registered, ii) when a new partition is added for an existing event, and/or iii) when event data is regenerated (which may require a partition swap to point an existing partition to a new S3 location).

To elaborate on the event fanning platform portion of the event data catalog 304, the event data catalog 304 orchestrates data streams using a data orchestration engine (e.g., TerraForm) as a source of truth for all event data streams within the inter-network facilitation system 104. Along with stream orchestration, the event data catalog 304 further establishes a source of truth for data flowing through each fanned data stream. The event bus system 106 utilizes the source of truth from the event data catalog 304 to maintain data lineage and for auditing and debugging. In some cases, the event fanning platform portion of the event data catalog 304 includes information such as: i) details of events flowing through a Kinesis stream (e.g., names and versions of events as well as filtering criteria applied before writing to the consumer application data stream 322), ii) change logs for updates made to fanned data streams, and/or iii) metadata for access control checks (e.g., to verify permissions).

Figure 4:
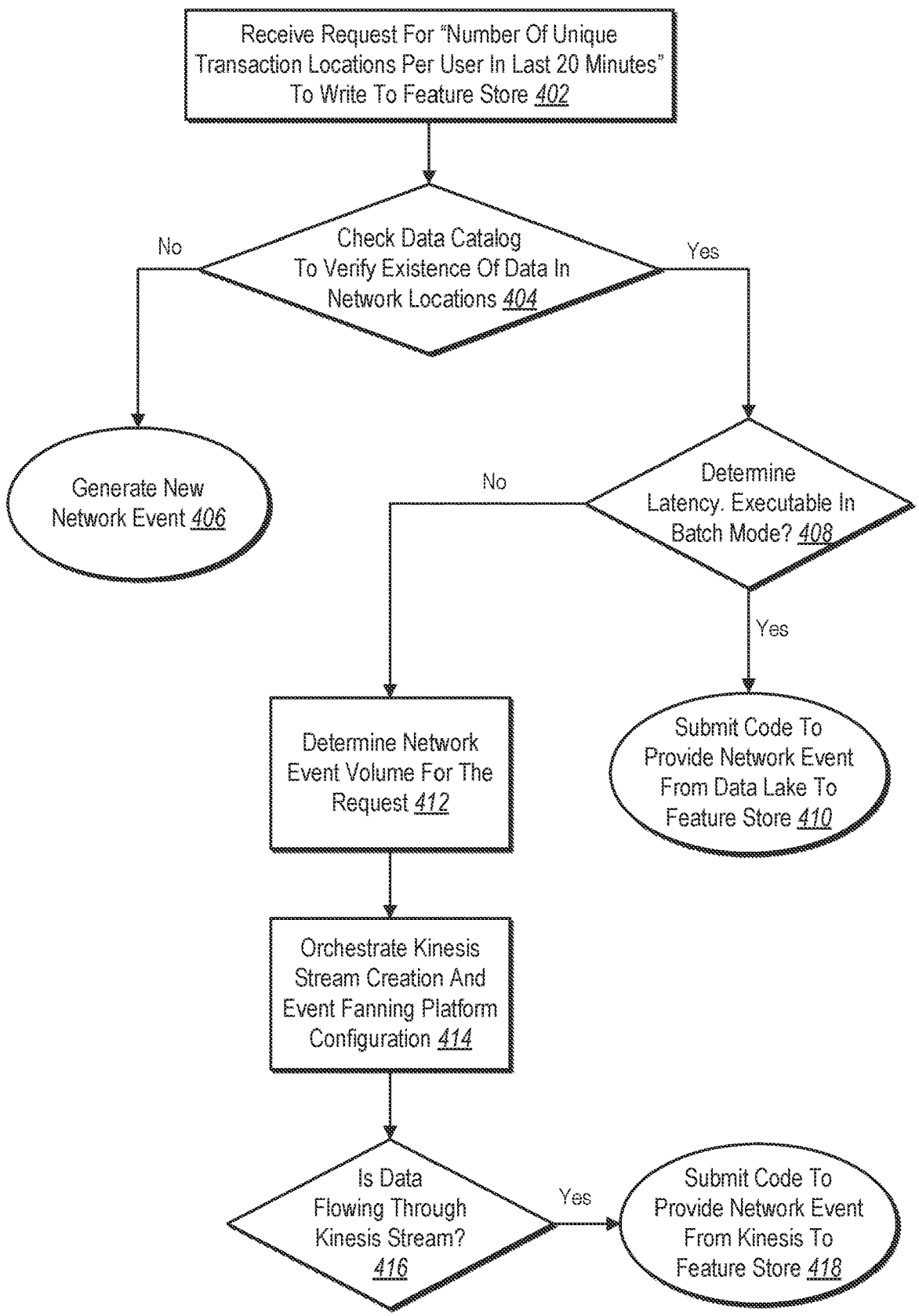
FIG. 4 illustrates example flow diagram for distributing a network event using a batch distribution data lake or an event fanning platform in accordance with one or more embodiments.

As mentioned, in certain described embodiments, the event bus system 106 utilizes a network event data streaming platform to facilitate self-service network event requests. In particular, the event bus system 106 receives a self-service transaction request and utilizes the network event data streaming platform to provide corresponding network event data. FIG. 4 illustrates an example flow diagram for distributing a network event in response to a particular event request in accordance with one or more embodiments. Indeed, FIG. 4 provides a specific example of a scenario for illustrative purposes.

As illustrated in FIG. 4, the event bus system 106 performs an act 402 to receive a request for a specific transaction request indicating or requesting a number of unique transaction locations per user in the last 20 minutes, where the requested transaction is designated for use to generate a machine learning prediction using the feature store (from among the third-party data servers 326). In response to the request, the event bus system 106 performs an act 404 to check a data catalog (e.g., the event data catalog 304) to verify the existence of the requested network event within the network event data streaming platform.

Based on determining that the requested network event is not stored or streamed within the network event data streaming platform (e.g., within the data lake 314 or within a fanned data stream of the event fanning platform 316), the event bus system 106 performs an act 406 to generate a new network event. In particular, the event bus system 106 utilizes one or more of the event logging engines 306 to generate a register a new network event within the network event data streaming platform according to configuration and parameters indicated by the request (e.g., to indicate the number of unique transaction locations per user in the last twenty 20 minutes). In some cases, the event bus system 106 receives one or more interactions (e.g., via the administrator device(s) 116) to generate a new network event. For instance, the event bus system 106 receives interactions to define event parameters via an event fanning configuration and/or designations of latency requirements, third-party data servers that will use the network event, and/or other event data described herein.

Based on determining that the requested network event is present within the data lake 314 or within a fanned data stream of the event fanning platform 316, on the other hand, the event bus system 106 performs an act 408 to determine a latency associated with the requested network event. For instance, the event bus system 106 determines a processing time, an access time, and/or a transmission time associated with the requested network event. Based on the latency, the event bus system 106 further determines whether distribution of the requested network event is executable in batch mode (e.g., using the data lake 314). If the requested network event can be provided in batch mode, the event bus system 106 performs an act 410 to submit computer code to instruct the network event data streaming platform to provide the network event from the data lake to the feature store (e.g., one of the third-party data servers 326).

If the event bus system 106 determines that the requested network event cannot be performed in batch mode (e.g., because the latency exceeds a batch mode threshold), the event bus system 106 performs an act 412 to determine a network event volume for the event request. In particular, the event bus system 106 determines (or receives an indication of) a volume or a number of network events (e.g., of the type indicated by the requested event) that the network event data streaming platform has available within the data lake 314 and/or within fanned data streams. Thus, event bus system 106 determines busy and/or available resources for provisioning new events if necessary. In some cases, the event bus system 106 determines a volume or a number of network events requested by the received self-service transaction request as part of the resource determination. Additionally, the event bus system 106 performs an act 414 to orchestrate creation of a Kinesis stream and a corresponding configuration for the stream using the event fanning platform 316 based on the volume(s). Indeed, as mentioned the event bus system 106 determines the event fanning configuration from the request as indicated by a requesting component/system (e.g., the consumer application server 320 or one of the third-party data servers 326).

As further illustrated in FIG. 4, the event bus system 106 performs an act 416 to determine whether the requested event data is flowing through the orchestrated Kinesis stream (e.g., a low-latency fanned data stream). In response to determining that the requested event data is flowing, the event bus system 106 performs an act 418 to submit computer code to instruct the network event data streaming platform to provide the requested network event from Kinesis (e.g., from the low-latency fanned data stream) to the features store (from among the third-party data servers 326), as indicated by the event request.

Figure 5:
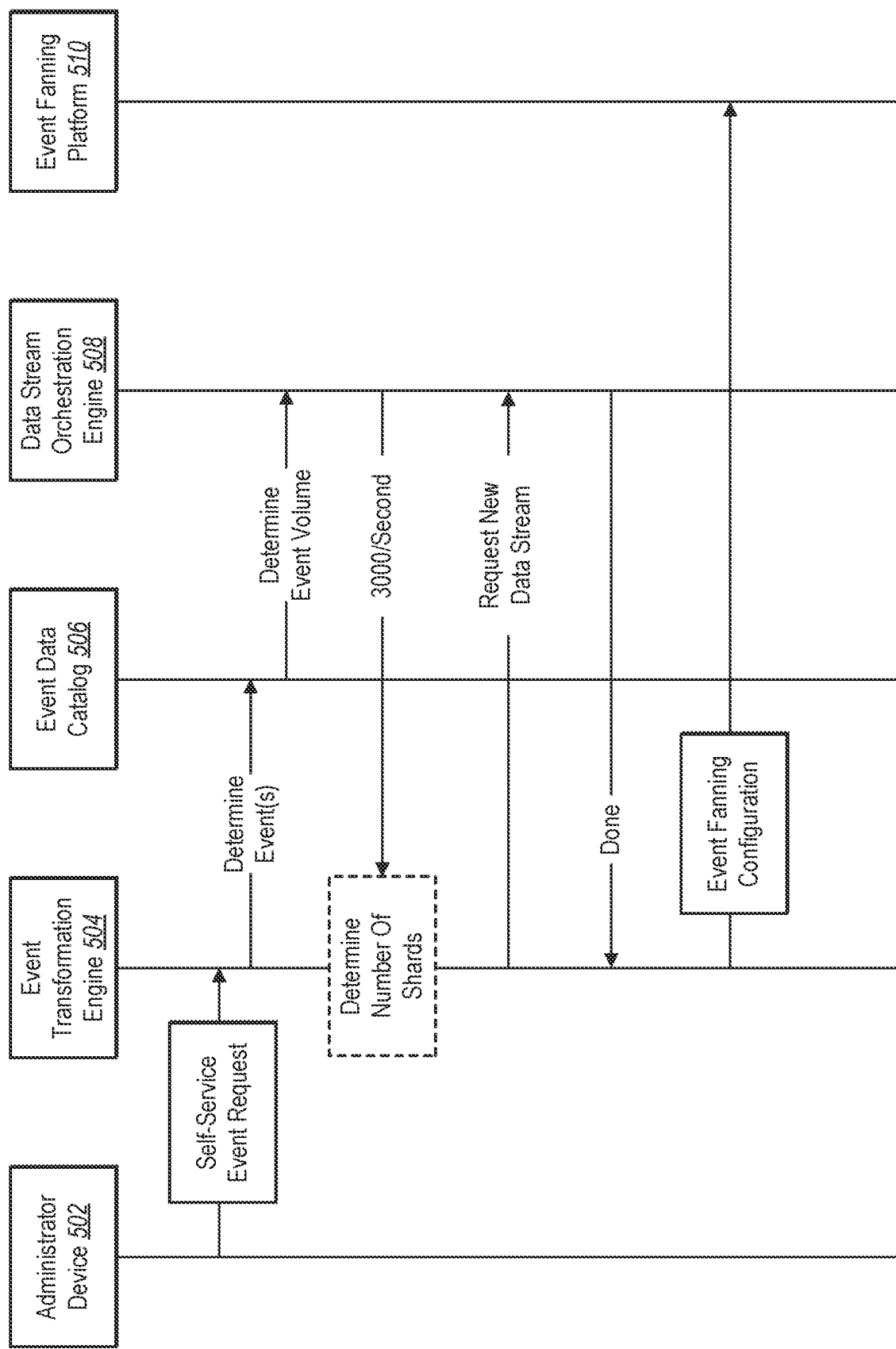
FIG. 5 illustrates an example wireline diagram of acts performed by components of the network event data streaming platform in accordance with one or more embodiments.

As mentioned above, in certain described embodiments, the event bus system 106 utilizes one or more network components or servers associated with a network event data streaming platform (e.g., the network event data streaming platform 110) to distribute a network event in response to a self-service event request. In particular, the event bus system 106 utilizes different components that each perform a respective function as part of the network event data streaming platform. FIG. 5 illustrates an example wireline diagram depicting processes performed by various components of the network event data streaming platform in response to a self-service event request in accordance with one or more embodiments. The example of FIG. 5 is based on a request for a short-retention network event provided via a low-latency fanned data stream (e.g., for a situation where batch distribution would be too slow).

As illustrated in FIG. 5, the administrator device 502 (e.g., the administrator device(s) 116) provides a self-service event request to the event bus system 106 or to the network event data streaming platform. For instance, the administrator device 502 can be a developer device or a device of downstream user that wants to generate a digital query to determine transaction information associated with the inter-network facilitation system 104. As shown, the event bus system 106 utilizes an event transformation engine 504 (as selected or determined via the event transformation framework 324) to process information from the request. For example, the event transformation engine 504 queries the event data catalog 506 (e.g., the event data catalog 304) to determine event(s) indicated by, or associated with, the self-service event request. Specifically, the event data catalog 506 determines which of the stored events correspond to the self-service event request.

In addition, the event data catalog 506 passes the information for the event(s) to a data stream orchestration engine 508 to determine a volume of network events streamed (or made available) by the network event data streaming platform (e.g., via low-latency fanned data streams). In response, the data stream orchestration engine 508 identifies the volume of network events within the network event data streaming platform that match the requested event (e.g., 3000 events per second). The data stream orchestration engine 508 passes the event volume information to the event transformation engine 504 to determine a number of server shards to use/dedicate for the network events of the self-service event request.

As further shown, the event bus system 106 utilizes the event transformation engine 504 to request a new data stream from a data stream orchestration engine 508 (e.g., TerraForm). In response, the data stream orchestration engine 508 orchestrates or generates a new Kinesis stream (or some other data stream) for distributing the requested event, where the Kinesis streams is configurable based on an event fanning configuration. Indeed, as shown, the event transformation engine 504 further provides an event fanning configuration (as received with the self-service event request) to an event fanning platform 510 (e.g., the event fanning platform 316). The event fanning platform 510 thus generates a fanned data stream for the request using the orchestrated Kinesis stream, where the network event is configured within the stream according to the event fanning configuration.

As mentioned above, in certain described embodiments, the event bus system 106 receives and responds to self-service event requests. In some cases, the event bus system 106 provides a self-service request interface whereby an administrator device (e.g., the administrator device(s) 116) or on a client device (e.g., the client device(s) 118) can arrange or set up a self-service event request.

As mentioned above, in certain described embodiments, the event bus system 106 receives and responds to self-service event requests. In some cases, the event bus system 106 provides a self-service request interface whereby an administrator device (e.g., the administrator device(s) 116) or on a client device (e.g., the client device(s) 118) can arrange or set up a self-service event request.

In some cases, the event bus system 106 generates a self-service request interface to, for example, generate a transaction report or initiate a machine learning prediction based on network events within the inter-network facilitation system 104. For example, a self-service request interface can include interactive elements for generating and submitting a self-service event request. In some cases, a self-service request interface is an interface that enables a user to search for network events available within a network event data streaming platform according to certain parameters and/or to generate a new network event within the network event data streaming platform according to requested parameters.

In some embodiments, a self-service request interface includes a search element that is interactive to enter a search query for a network event. In conjunction with the search element, a self-service request interface can include an interactive location element for setting a geographic location as a parameter for network events and an interactive latency element for setting a latency requirement for a network event request. Based on a search query together with a location parameter and a latency parameter, the event bus system 106 can generate or populate a list of available network events within self-service request interface. For example, the event bus system 106 can determine whether the latency input via the self-service request interface is above or below a threshold latency. If the latency is above a threshold, the event bus system 106 accesses a data lake (e.g., the data lake 314) to retrieve available network events. If the latency is below a threshold, event bus system 106 accesses a fanned data stream from an event fanning platform (e.g., the event fanning platform 316) to retrieve available network events. Accordingly, the event bus system 106 can populate a list of available network events within the self-service request interface for selection as part of a self-service event request.

In one or more embodiments, a self-service request interface includes a selectable element for indicating that a requested network event is not available. Based on user interaction with the new event option, the event bus system 106 determines to generate a new network event within the network event data streaming platform. For example, the event bus system 106 generates a new event according to parameters input via the self-service request interface. In some cases, the event bus system 106 generates and presents additional information via the self-service request interface for defining a new network event to indicate specifically what information to include within the event. In certain embodiments, the event bus system 106 need not receive an indication via the self-service request interface that the event request is for a new network event, but the event bus system 106 may instead determine that the request is for a new network event based on the parameters entered via the self-service request interface.

To generate a new network event, the event bus system 106 queries a data catalog (e.g., the event data catalog 304) to determine if the requested network event is available. If the requested event is not available, then the event bus system 106 generates the new network event. Specifically, the event bus system 106 checks a schema repository (e.g., the schema repository 302) to determine if a schema exists for the requested network event. If no such schema exists, then the event bus system 106 generates a new schema for the network event and publishes the new schema in the schema repository. If a schema does exist for the requested network event (or upon publishing the new schema), then the event bus system 106 generates computer code to initiate production of the new network event using the new schema. For instance, the event bus system 106 utilizes one or more of the event logging engines 306 to generate the computer code for the new network event to publish for availability within a network event data streaming platform.

In some embodiments, a self-service request interface further includes a submit element to submit a self-service event request. In response to an indication of user interaction with the submit element, the event bus system 106 receives a self-service event request. As described herein, the event bus system 106 further identifies or generates the network event indicated via the self-service request interface. For instance, the event bus system 106 accesses an available network event or generates a new network event to make available via a data lake or a fanned data stream (e.g., based on the latency associated with the request).

The components of the event bus system 106 can include software, hardware, or both. For example, the components of the event bus system 106 can include one or more instructions stored on a computer-readable storage medium and executable by processors of one or more computing devices (e.g., the server device(s) 102, the client device(s) 118, the administrator device(s) 116, and/or the third party processing server(s) 112). When executed by the one or more processors, the computer-executable instructions of the event bus system 106 can cause a computing device to perform the methods described herein. Alternatively, the components of the event bus system 106 can comprise hardware, such as a special purpose processing device to perform a certain function or group of functions. Additionally or alternatively, the components of the event bus system 106 can include a combination of computer-executable instructions and hardware.

Furthermore, the components of the event bus system 106 performing the functions described herein may, for example, be implemented as part of a stand-alone application, as a module of an application, as a plug-in for applications including content management applications, as a library function or functions that may be called by other applications, and/or as a cloud-computing model. Thus, the components of the event bus system 106 may be implemented as part of a stand-alone application on a personal computing device or a mobile device. Alternatively or additionally, the components of the event bus system 106 may be implemented in any application that allows creation and delivery of financial and/or marketing content to users, including, but not limited to, various applications.

FIGS. 1-5, the corresponding text, and the examples provide a number of different systems, methods, and non-transitory computer readable media for generating and providing network events for self-service event requests utilizing a network event data streaming platform. In addition to the foregoing, embodiments can also be described in terms of flowcharts comprising acts for accomplishing a particular result. For example, FIG. 6 illustrates a flowchart of an example sequence of acts in accordance with one or more embodiments.

Figure 6:
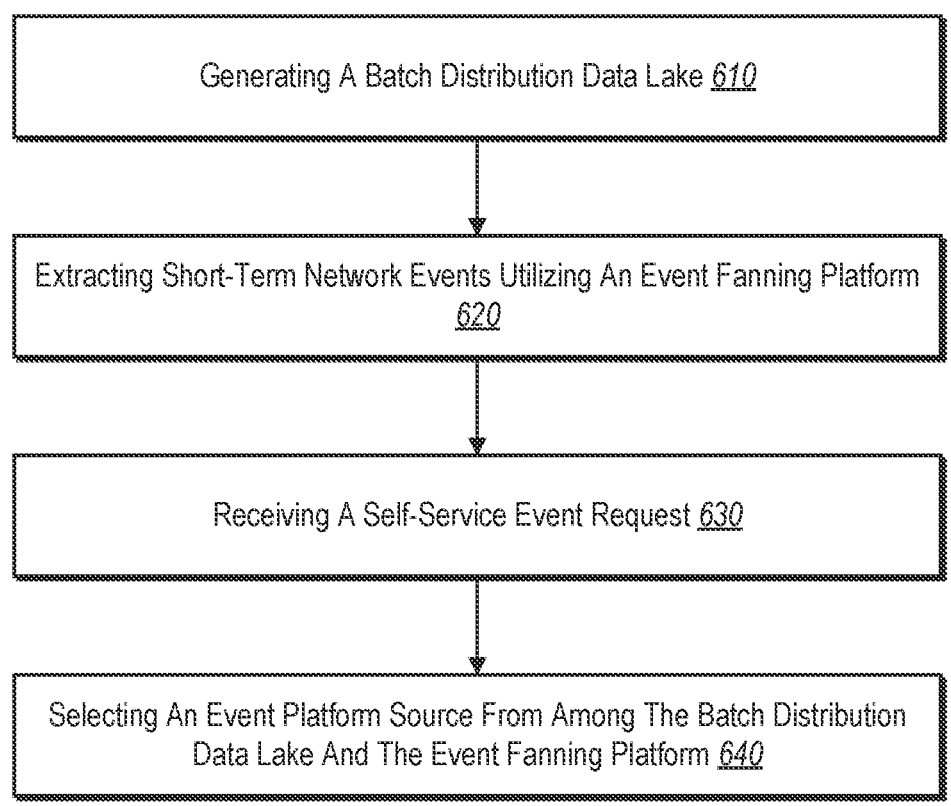
FIG. 6 illustrates an example series of acts for generating and providing network events for self-service event requests utilizing a network event data streaming platform in accordance with one or more embodiments.

While FIG. 6 illustrates acts according to some embodiments, alternative embodiments may omit, add to, reorder, and/or modify any of the acts shown in FIG. 6. The acts of FIG. 6 can be performed as part of a method. Alternatively, a non-transitory computer readable medium can comprise instructions, that when executed by one or more processors, cause a computing device to perform the acts of FIG. 6. In still further embodiments, a system can perform the acts of FIG. 6. Additionally, the acts described herein may be repeated or performed in parallel with one another or in parallel with different instances of the same or other similar acts.

FIG. 6 illustrates an example series of acts 600 for generating and providing network events for self-service event requests utilizing a network event data streaming platform. The series of acts 600 can include acts 610-640. The act 610 can involve generating a batch distribution data lake. The act 620 can involve extracting short-retention network events utilizing an event fanning platform. The act 630 can involve receiving a self-service event request. The act 640 can involve selecting an event platform source from among the batch distribution data lake and the event fanning platform.

In one or more embodiments, the series of acts 600 includes an act of generating a batch distribution data lake storing a plurality of network events from a global data stream. The series of acts 600 can also include an act of extracting a set of short-retention network events from the global data stream utilizing an event fanning platform to generate a set of low-latency fanned data streams for the set of short-retention network events. Further, the series of acts 600 can include an act of receiving a self-service event request indicating a requested network event from the global data stream. Additionally, the series of acts 600 can include an act of, based on a latency of the requested network event, select an event platform source for the requested network event from among the batch distribution data lake and the event fanning platform associated with the set of low-latency fanned data streams.

In some embodiments, the series of acts 600 includes an act of determining that the latency of the self-service event request exceeds a threshold latency. In these or other embodiments, the series of acts 600 includes an act of, based on determining that the latency exceeds the threshold latency, selecting the batch distribution data lake as the event platform source for the requested network event. In certain cases, the series of acts 600 includes acts of determining that the latency of the self-service event request is below a threshold latency and, based on determining that the latency is below the threshold latency, selecting the event fanning platform as the event platform source for the requested network event.

In one or more embodiments, the series of acts 600 includes an act of generating the batch distribution data lake by: reading the plurality of network events from the global data stream and writing the plurality of network events to a network event database for long-term retention. The series of acts 600 can also include an act of extracting the set of short-retention network events by utilizing the event fanning platform to: read the plurality of network events from the global data stream, determine event fanning configurations indicating which network events from the plurality of network events to provide to which consumer application servers, and generate the set of low-latency fanned data streams for short-term retention from the plurality of network events according to the event fanning configurations.

Additionally, the series of acts 600 can include an act of generating a consumer application data stream for the self-service event request by: in response to receiving the self-service event request, generating an event fanning configuration indicating one or more short-retention network events to provide to a consumer application server associated with the consumer application data stream and generating a low-latency fanned data stream broadcasting the one or more short-retention network events to the consumer application server according to the event fanning configuration. The series of acts 600 can also include an act of generating the plurality of network events for the global data stream by: receiving network events indicating modifications to network data associated with an inter-network facilitation system from one or more event logging servers and generating schematized versions of the network events from the one or more event logging servers. The series of acts 600 can also include an act of broadcasting the schematized versions of the network events via the global data stream.

In one or more embodiments, the series of acts 600 includes an act of receiving an additional self-service event request indicating an additional requested network event. The series of acts 600 can also include an act of determining that the global data stream does not include the additional requested network event. Additionally, the series of acts 600 can include an act of, based on determining that the global data stream does not include the additional requested network event, generating a new network event corresponding to the additional requested network event to include within the global data stream according to the self-service event request. Further, the series of acts 600 can include an act of selecting an event transformation engine to process the requested network event according to the self-service event request.

Additionally, the series of acts 600 can include an act of receiving an event data request from a third-party data server indicating requested network event data and an act of, in response to the event data request, filtering network event data to remove network event data other than the requested network event data. In some cases, the series of acts 600 includes an act of generating a consumer application data stream for the self-service event request by: determining, from the self-service event request, an event fanning configuration indicating one or more short-retention network events to provide to a consumer application server associated with the consumer application data stream, performing an access control check to verify permission of the consumer application data stream to access the one or more short-retention network events, and based on the access control check, generating a low-latency fanned data stream to broadcast the one or more short-retention network events to the consumer application server according to the event fanning configuration.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system, including by one or more servers. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, virtual reality devices, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 7:
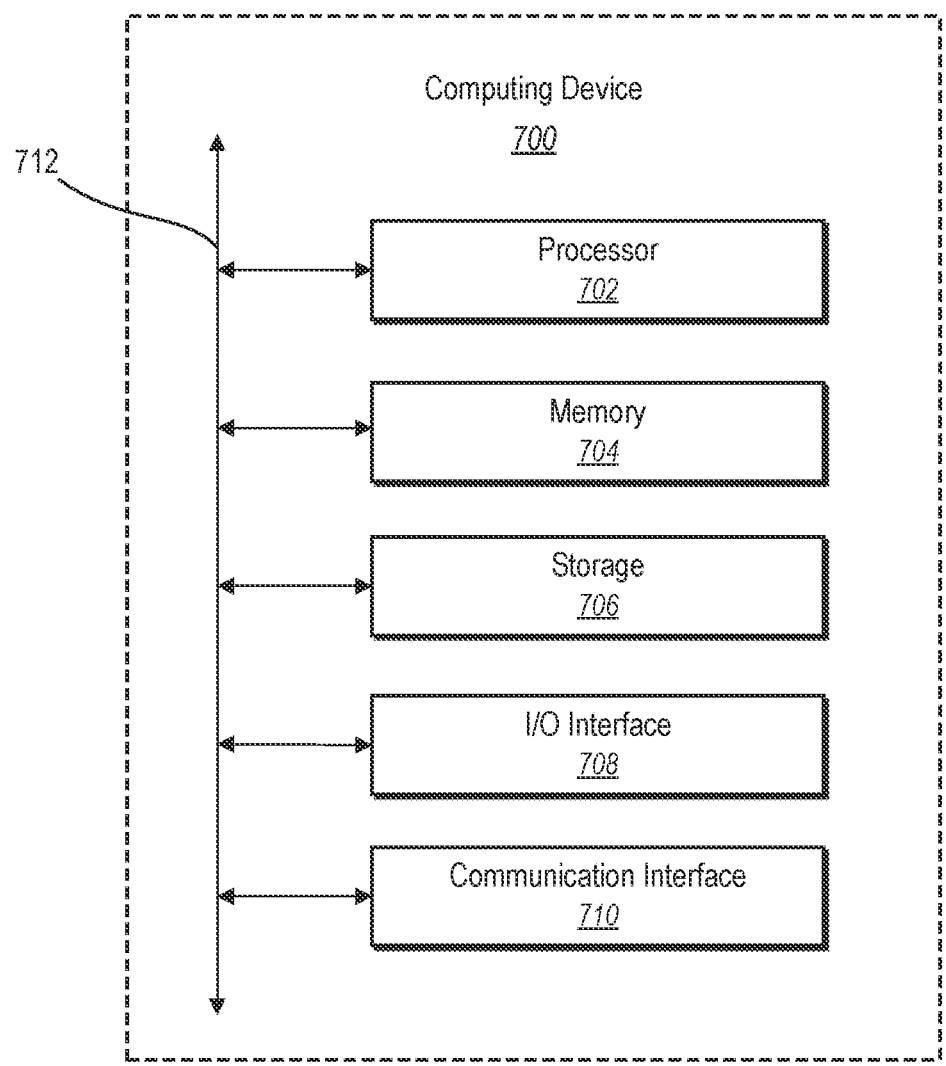
FIG. 7 illustrates a block diagram of a computing device for implementing one or more embodiments of the present disclosure.

FIG. 7 illustrates, in block diagram form, an exemplary computing device 700 (e.g., the client device(s) 118, the administrator device(s) 116, or the server device(s) 102) that may be configured to perform one or more of the processes described above. As shown by FIG. 7, the computing device can comprise a processor 702, memory 704, a storage device 706, an I/O interface 708, and a communication interface 710. In certain embodiments, the computing device 700 can include fewer or more components than those shown in FIG. 7. Components of computing device 700 shown in FIG. 7 will now be described in additional detail.

In particular embodiments, processor(s) 702 includes hardware for executing instructions, such as those making up a computer program. As an example, and not by way of limitation, to execute instructions, processor(s) 702 may retrieve (or fetch) the instructions from an internal register, an internal cache, memory 704, or a storage device 706 and decode and execute them.

The computing device 700 includes memory 704, which is coupled to the processor(s) 702. The memory 704 may be used for storing data, metadata, and programs for execution by the processor(s). The memory 704 may include one or more of volatile and non-volatile memories, such as Random Access Memory ("RAM"), Read Only Memory ("ROM"), a solid-state disk ("SSD"), Flash, Phase Change Memory ("PCM"), or other types of data storage. The memory 704 may be internal or distributed memory.

The computing device 700 includes a storage device 706 includes storage for storing data or instructions. As an example, and not by way of limitation, storage device 706 can comprise a non-transitory storage medium described above. The storage device 706 may include a hard disk drive ("HDD"), flash memory, a Universal Serial Bus ("USB") drive or a combination of these or other storage devices.

The computing device 700 also includes one or more input or output interface 708 (or "I/O interface 708"), which are provided to allow a user (e.g., requester or provider) to provide input to (such as user strokes), receive output from, and otherwise transfer data to and from the computing device 700. These I/O interface 708 may include a mouse, keypad or a keyboard, a touch screen, camera, optical scanner, network interface, modem, other known I/O devices or a combination of such I/O interface 708. The touch screen may be activated with a stylus or a finger.

The I/O interface 708 may include one or more devices for presenting output to a user, including, but not limited to, a graphics engine, a display (e.g., a display screen), one or more output providers (e.g., display providers), one or more audio speakers, and one or more audio providers. In certain embodiments, interface 708 is configured to provide graphical data to a display for presentation to a user. The graphical data may be representative of one or more graphical user interfaces and/or any other graphical content as may serve a particular implementation.

The computing device 700 can further include a communication interface 710. The communication interface 710 can include hardware, software, or both. The communication interface 710 can provide one or more interfaces for communication (such as, for example, packet-based communication) between the computing device and one or more other computing devices 700 or one or more networks. As an example, and not by way of limitation, communication interface 710 may include a network interface controller ("NIC") or network adapter for communicating with an Ethernet or other wire-based network or a wireless NIC ("WNIC") or wireless adapter for communicating with a wireless network, such as a WI-FI. The computing device 700 can further include a bus 712. The bus 712 can comprise hardware, software, or both that connects components of computing device 700 to each other.

Figure 8:
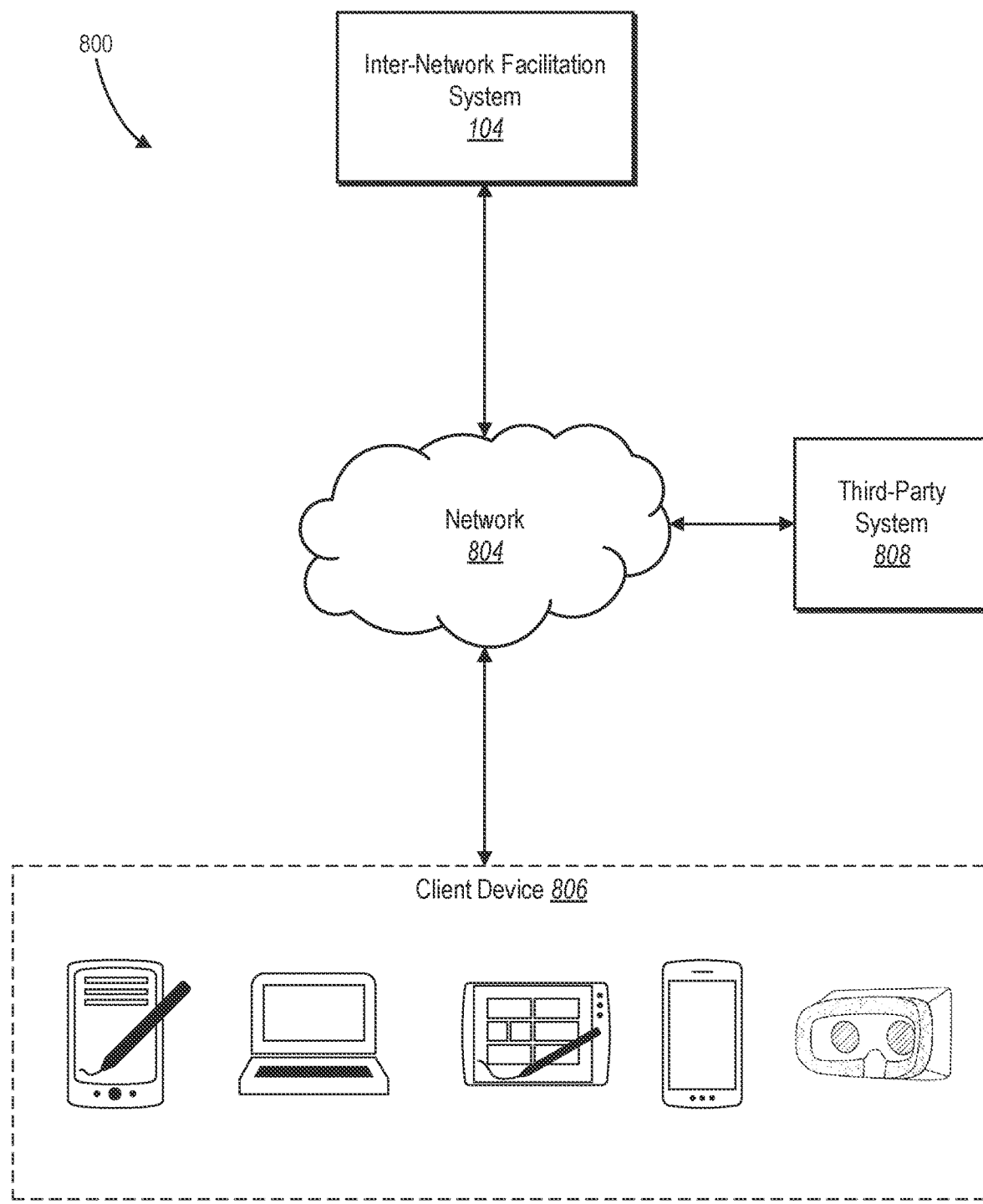
FIG. 8 illustrates an example environment for an inter-network facilitation system in accordance with one or more embodiments.

FIG. 8 illustrates an example network environment 800 of the inter-network facilitation system 104. The network environment 800 includes a client device 806 (e.g., the client device 118 and/or administrator device(s) 116), an inter-network facilitation system 104, and a third-party system 808 (e.g., the third-party processing server(s) 112) connected to each other by a network 804. Although FIG. 8 illustrates a particular arrangement of the client device 806, the inter-network facilitation system 104, the third-party system 808, and the network 804, this disclosure contemplates any suitable arrangement of client device 806, the inter-network facilitation system 104, the third-party system 808, and the network 804. As an example, and not by way of limitation, two or more of client device 806, the inter-network facilitation system 104, and the third-party system 808 communicate directly, bypassing network 804. As another example, two or more of client device 806, the inter-network facilitation system 104, and the third-party system 808 may be physically or logically co-located with each other in whole or in part.

Moreover, although FIG. 8 illustrates a particular number of client devices 806, inter-network facilitation systems 104, third-party systems 808, and networks 804, this disclosure contemplates any suitable number of client devices 806, inter-network facilitation system 104, third-party systems 808, and networks 804. As an example, and not by way of limitation, network environment 800 may include multiple client devices 806, inter-network facilitation system 104, third-party systems 808, and/or networks 804.

This disclosure contemplates any suitable network 804. As an example, and not by way of limitation, one or more portions of network 804 may include an ad hoc network, an intranet, an extranet, a virtual private network ("VPN"), a local area network ("LAN"), a wireless LAN ("WLAN"), a wide area network ("WAN"), a wireless WAN ("WWAN"), a metropolitan area network ("MAN"), a portion of the Internet, a portion of the Public Switched Telephone Network ("PSTN"), a cellular telephone network, or a combination of two or more of these. Network 804 may include one or more networks 804.

Links may connect client device 806, the inter-network facilitation system 104 (which hosts the event bus system 106), and third-party system 808 to network 804 or to each other. This disclosure contemplates any suitable links. In particular embodiments, one or more links include one or more wireline (such as for example Digital Subscriber Line ("DSL") or Data Over Cable Service Interface Specification ("DOCSIS"), wireless (such as for example Wi-Fi or Worldwide Interoperability for Microwave Access ("WiMAX"), or optical (such as for example Synchronous Optical Network ("SONET") or Synchronous Digital Hierarchy ("SDH") links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 800. One or more first links may differ in one or more respects from one or more second links.

In particular embodiments, the client device 806 may be an electronic device including hardware, software, or embedded logic components or a combination of two or more such components and capable of carrying out the appropriate functionalities implemented or supported by client device 806. As an example, and not by way of limitation, a client device 806 may include any of the computing devices discussed above in relation to FIG. 7. A client device 806 may enable a network user at the client device 806 to access network 804. A client device 806 may enable its user to communicate with other users at other client devices 806.

In particular embodiments, the client device 806 may include a requester application or a web browser, such as MICROSOFT INTERNET EXPLORER, GOOGLE CHROME or MOZILLA FIREFOX, and may have one or more add-ons, plug-ins, or other extensions, such as TOOL-BAR or YAHOO TOOLBAR. A user at the client device 806 may enter a Uniform Resource Locator ("URL") or other address directing the web browser to a particular server (such as server), and the web browser may generate a Hyper Text Transfer Protocol ("HTTP") request and communicate the HTTP request to server. The server may accept the HTTP request and communicate to the client device 806 one or more Hyper Text Markup Language ("HTML") files responsive to the HTTP request. The client device 806 may render a webpage based on the HTML files from the server for presentation to the user. This disclosure contemplates any suitable webpage files. As an example, and not by way of limitation, webpages may render from HTML files, Extensible Hyper Text Markup Language ("XHTML") files, or Extensible Markup Language ("XML") files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, inter-network facilitation system 104 may be a network-addressable computing system that can interface between two or more computing networks or servers associated with different entities such as financial institutions (e.g., banks, credit processing systems, ATM systems, or others). In particular, the inter-network facilitation system 104 can send and receive network communications (e.g., via the network 804) to link the third-party system 808. For example, the inter-network facilitation system 104 may receive authentication credentials from a user to link a third-party system 808 such as an online banking system to link an online bank account, credit account, debit account, or other financial account to a user profile within the inter-network facilitation system 104. The inter-network facilitation system 104 can subsequently communicate with the third-party system 808 to detect or identify balances, transactions, withdrawal, transfers, deposits, credits, debits, or other transaction types associated with the third-party system 808. The inter-network facilitation system 104 can further provide the aforementioned or other financial information associated with the third-party system 808 for display via the client device 806. In some cases, the inter-network facilitation system 104 links more than one third-party system 808, receiving account information for accounts associated with each respective third-party system 808 and performing operations or transactions between the different systems via authorized network connections.

In particular embodiments, the inter-network facilitation system 104 may interface between an online banking system and a credit processing system via the network 804. For example, the inter-network facilitation system 104 can provide access to a bank account of a third-party system 808 and linked to a user profile within the inter-network facilitation system 104. Indeed, the inter-network facilitation system 104 can facilitate access to, and transactions to and from, the bank account of the third-party system 808 via a client application of the inter-network facilitation system 104 on the client device 806. The inter-network facilitation system 104 can also communicate with a credit processing system, an ATM system, and/or other financial systems (e.g., via the network 804) to authorize and process credit charges to a credit account, perform ATM transactions, perform transfers (or other transactions) between user profiles or across accounts of different third-party systems 808, and to present corresponding information via the client device 806.

In particular embodiments, the inter-network facilitation system 104 includes a model (e.g., a machine learning model) for approving or denying transactions. For example, the inter-network facilitation system 104 includes a transaction approval machine learning model that is trained based on training data such as user profile information (e.g., name, age, location, and/or income), account information (e.g., current balance, average balance, maximum balance, and/or minimum balance), credit usage, and/or other transaction history. Based on one or more of these data (from the inter-network facilitation system 104 and/or one or more third-party systems 808), the inter-network facilitation system 104 can utilize the transaction approval machine learning model to generate a prediction (e.g., a percentage likelihood) of approval or denial of a transaction (e.g., a withdrawal, a transfer, or a purchase) across one or more networked systems.

The inter-network facilitation system 104 may be accessed by the other components of network environment 800 either directly or via network 804. In particular embodiments, the inter-network facilitation system 104 may include one or more servers. Each server may be a unitary server or a distributed server spanning multiple computers or multiple datacenters. Servers may be of various types, such as, for example and without limitation, web server, news server, mail server, message server, advertising server, file server, application server, exchange server, database server, proxy server, another server suitable for performing functions or processes described herein, or any combination thereof. In particular embodiments, each server may include hardware, software, or embedded logic components or a combination of two or more such components for carrying out the appropriate functionalities implemented or supported by server. In particular embodiments, the inter-network facilitation system 104 may include one or more data stores. Data stores may be used to store various types of information. In particular embodiments, the information stored in data stores may be organized according to specific data structures. In particular embodiments, each data store may be a relational, columnar, correlation, or other suitable database. Although this disclosure describes or illustrates particular types of databases, this disclosure contemplates any suitable types of databases. Particular embodiments may provide interfaces that enable a client device 806, or an inter-network facilitation system 104 to manage, retrieve, modify, add, or delete, the information stored in data store.

In particular embodiments, the inter-network facilitation system 104 may provide users with the ability to take actions on various types of items or objects, supported by the inter-network facilitation system 104. As an example, and not by way of limitation, the items and objects may include financial institution networks for banking, credit processing, or other transactions, to which users of the inter-network facilitation system 104 may belong, computer-based applications that a user may use, transactions, interactions that a user may perform, or other suitable items or objects. A user may interact with anything that is capable of being represented in the inter-network facilitation system 104 or by an external system of a third-party system, which is separate from inter-network facilitation system 104 and coupled to the inter-network facilitation system 104 via a network 804.

In particular embodiments, the inter-network facilitation system 104 may be capable of linking a variety of entities. As an example, and not by way of limitation, the inter-network facilitation system 104 may enable users to interact with each other or other entities, or to allow users to interact with these entities through an application programming interfaces ("API") or other communication channels.

In particular embodiments, the inter-network facilitation system 104 may include a variety of servers, sub-systems, programs, modules, logs, and data stores. In particular embodiments, the inter-network facilitation system 104 may include one or more of the following: a web server, action logger, API-request server, transaction engine, cross-institution network interface manager, notification controller, action log, third-party-content-object-exposure log, inference module, authorization/privacy server, search module, user-interface module, user-profile (e.g., provider profile or requester profile) store, connection store, third-party content store, or location store. The inter-network facilitation system 104 may also include suitable components such as network interfaces, security mechanisms, load balancers, failover servers, management-and-network-operations consoles, other suitable components, or any suitable combination thereof. In particular embodiments, the inter-network facilitation system 104 may include one or more user-profile stores for storing user profiles and/or account information for credit accounts, secured accounts, secondary accounts, and other affiliated financial networking system accounts. A user profile may include, for example, biographic information, demographic information, financial information, behavioral information, social information, or other types of descriptive information, such as interests, affinities, or location.

The web server may include a mail server or other messaging functionality for receiving and routing messages between the inter-network facilitation system 104 and one or more client devices 806. An action logger may be used to receive communications from a web server about a user's actions on or off the inter-network facilitation system 104. In conjunction with the action log, a third-party-content-object log may be maintained of user exposures to third-party-content objects. A notification controller may provide information regarding content objects to a client device 806. Information may be pushed to a client device 806 as notifications, or information may be pulled from client device 806 responsive to a request received from client device 806. Authorization servers may be used to enforce one or more privacy settings of the users of the inter-network facilitation system 104. A privacy setting of a user determines how particular information associated with a user can be shared. The authorization server may allow users to opt in to or opt out of having their actions logged by the inter-network facilitation system 104 or shared with other systems, such as, for example, by setting appropriate privacy settings. Third-party-content-object stores may be used to store content objects received from third parties. Location stores may be used for storing location information received from client devices 806 associated with users.

In addition, the third-party system 808 can include one or more computing devices, servers, or sub-networks associated with internet banks, central banks, commercial banks, retail banks, credit processors, credit issuers, ATM systems, credit unions, loan associates, brokerage firms, linked to the inter-network facilitation system 104 via the network 804. A third-party system 808 can communicate with the inter-network facilitation system 104 to provide financial information pertaining to balances, transactions, and other information, whereupon the inter-network facilitation system 104 can provide corresponding information for display via the client device 806. In particular embodiments, a third-party system 808 communicates with the inter-network facilitation system 104 to update account balances, transaction histories, credit usage, and other internal information of the inter-network facilitation system 104 and/or the third-party system 808 based on user interaction with the inter-network facilitation system 104 (e.g., via the client device 806). Indeed, the inter-network facilitation system 104 can synchronize information across one or more third-party systems 808 to reflect accurate account information (e.g., balances, transactions, etc.) across one or more networked systems, including instances where a transaction (e.g., a transfer) from one third-party system 808 affects another third-party system 808.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A system comprising:
   at least one processor; and
   a non-transitory computer readable medium storing instructions that, when executed by the at least one processor, cause the system to:
   generate a batch distribution data lake storing a plurality of network events from a global data stream;

extract a set of network events from the global data stream utilizing an event fanning platform to generate a set of low-latency fanned data streams for the set of network events;
determine a latency for a self-service event request indicating a requested network event from the global data stream; and
based on comparing the latency of the requested network event with a threshold latency, select an event platform source for the requested network event from among the batch distribution data lake storing network events with latencies above the threshold latency and the event fanning platform broadcasting the set of low-latency fanned data streams for network events with latencies below the threshold latency.

2. The system of claim 1, further storing instructions that, when executed by the at least one processor, cause the system to:
determine that the latency of the requested network event exceeds the threshold latency; and
based on determining that the latency exceeds the threshold latency, select the batch distribution data lake as the event platform source for the requested network event.

3. The system of claim 1, further storing instructions that, when executed by the at least one processor, cause the system to:
determine that the latency of the requested network event is below the threshold latency; and
based on determining that the latency is below the threshold latency, select the event fanning platform as the event platform source for the requested network event.

4. The system of claim 1, further storing instructions that, when executed by the at least one processor, cause the system to generate the batch distribution data lake by:
reading the plurality of network events from the global data stream; and
writing the plurality of network events to a network event database for long-term retention.

5. The system of claim 1, further storing instructions that, when executed by the at least one processor, cause the system to extract the set of network events by utilizing the event fanning platform to:
read the plurality of network events from the global data stream;
determine event fanning configurations indicating which network events from the plurality of network events to provide to which consumer application servers; and
generate the set of low-latency fanned data streams for short-term retention from the plurality of network events according to the event fanning configurations.

6. The system of claim 1, further storing instructions that, when executed by the at least one processor, cause the system to generate a consumer application data stream for the self-service event request by:
in response to receiving the self-service event request, generating an event fanning configuration indicating one or more network events to provide to a consumer application server associated with the consumer application data stream; and
generating a low-latency fanned data stream broadcasting the one or more network events to the consumer application server according to the event fanning configuration.

7. The system of claim 1, further storing instructions that, when executed by the at least one processor, cause the system to generate the plurality of network events for the global data stream by:
receiving network events indicating modifications to network data associated with an inter-network facilitation system from one or more event logging servers; and
generating schematized versions of the network events from the one or more event logging servers.

8. The system of claim 1, further storing instructions that, when executed by the at least one processor, cause the system to:
receive an additional self-service event request indicating an additional requested network event;
determine that the global data stream does not include the additional requested network event; and
based on determining that the global data stream does not include the additional requested network event, modify an event fanning configuration corresponding to the additional requested network event within the global data stream according to the additional self-service event request.

9. A method comprising:
generating a batch distribution data lake storing a plurality of network events from a global data stream;
extracting a set of network events from the global data stream utilizing an event fanning platform to generate a set of low-latency fanned data streams for the set of network events;
determining a latency for a self-service event request indicating a requested network event from the global data stream; and
based on comparing the latency of the requested network event with a threshold latency, selecting an event platform source for the requested network event from among the batch distribution data lake storing network events with latencies above the threshold latency and the event fanning platform broadcasting the set of low-latency fanned data streams for network events below the threshold latency.

10. The method of claim 9, further comprising:
determining that the latency of the requested network event exceeds the threshold latency; and
based on determining that the latency exceeds the threshold latency, selecting the batch distribution data lake as the event platform source for the requested network event.

11. The method of claim 9, further comprising:
determining that the latency of the requested network event is below the threshold latency; and
based on determining that the latency is below the threshold latency, selecting the event fanning platform as the event platform source for the requested network event.

12. The method of claim 9, further comprising selecting an event transformation engine to process the requested network event according to the self-service event request.

13. The method of claim 9, further comprising:
receiving an event data request from a third-party data server indicating requested network event data; and
in response to the event data request, filtering network event data to remove network event data other than the requested network event data.

14. The method of claim 9, further comprising generating a consumer application data stream for the self-service event request by:
determining, from the self-service event request, an event fanning configuration indicating one or more network events to provide to a consumer application server associated with the consumer application data stream;

performing an access control check to verify permission of the consumer application data stream to access the one or more network events; and based on the access control check, generating a low-latency fanned data stream to broadcast the one or more network events to the consumer application server according to the event fanning configuration.

15. The method of claim 9, further comprising limiting distribution of each of the set of low-latency fanned data streams associated with the event fanning platform to a single respective consumer application server.

16. A non-transitory computer readable medium storing instructions that, when executed by at least one processor, cause a computing device to:

generate a batch distribution data lake storing a plurality of network events from a global data stream;

extract a set of network events from the global data stream utilizing an event fanning platform to generate a set of low-latency fanned data streams for the set of network events;

determine a latency for a self-service event request indicating a requested network event from the global data stream; and based on comparing the latency of the requested network event with a threshold latency, select an event platform source for the requested network event from among the batch distribution data lake storing network events with latencies above the threshold latency and the event fanning platform broadcasting the set of low-latency fanned data streams for network events with latencies below the threshold latency.

17. The non-transitory computer readable medium of claim 16, further storing instructions that, when executed by the at least one processor, cause the computing device to:

determine that the latency of the requested network event exceeds the threshold latency; and based on determining that the latency exceeds the threshold latency, select the batch distribution data lake as the event platform source for the requested network event.

18. The non-transitory computer readable medium of claim 16, further storing instructions that, when executed by the at least one processor, cause the computing device to:

determine that the latency of the requested network event is below the threshold latency; and based on determining that the latency is below the threshold latency, select the event fanning platform as the event platform source for the requested network event.

19. The non-transitory computer readable medium of claim 16, further storing instructions that, when executed by the at least one processor, cause the computing device to generate a consumer application data stream for the self-service event request by:

determining, from the self-service event request, an event fanning configuration indicating one or more network events to provide to a consumer application server associated with the consumer application data stream; and generating a low-latency fanned data stream broadcasting the one or more network events to the consumer application server according to the event fanning configuration.

20. The non-transitory computer readable medium of claim 16, further storing instructions that, when executed by the at least one processor, cause the computing device to generate the plurality of network events for the global data stream by:

receiving network events indicating modifications to network data associated with an inter-network facilitation system from one or more event logging servers;

generating schematized versions of the network events from the one or more event logging servers; and broadcasting the schematized versions of the network events via the global data stream.

* * * * *